United States Patent
Mori et al.

(10) Patent No.: US 6,889,931 B2
(45) Date of Patent: May 10, 2005

(54) WEBBING WINDING DEVICE AND CLUTCH MECHANISM

(75) Inventors: Shinji Mori, Aichi-ken (JP); Teruhiko Koide, Aichi-ken (JP); Fuminori Komiya, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 14 days.

(21) Appl. No.: 10/615,444

(22) Filed: Jul. 9, 2003

(65) Prior Publication Data
US 2004/0065762 A1 Apr. 8, 2004

(30) Foreign Application Priority Data
Jul. 11, 2002 (JP) ........................................ 2002-203140

(51) Int. Cl.[7] ............................................. B65H 75/48
(52) U.S. Cl. ................. 242/390.9; 242/384.2
(58) Field of Search ........................ 242/390.8, 390.9, 242/384.1, 384.2; 280/806, 807; 297/478

(56) References Cited

U.S. PATENT DOCUMENTS

| | | | | |
|---|---|---|---|---|
| 4,498,642 A | * | 2/1985 | Doty | ........................... 280/806 |
| 4,632,331 A | * | 12/1986 | Bracnik et al. | ........... 242/384.2 |
| 4,726,541 A | * | 2/1988 | Tsukamoto et al. | ....... 242/384.1 |
| 4,750,685 A | | 6/1988 | Frei | |
| 4,948,066 A | * | 8/1990 | Matsumoto et al. | ...... 242/384.2 |
| 5,333,906 A | * | 8/1994 | Fujimura et al. | ........... 280/806 |
| 5,624,087 A | * | 4/1997 | Dick et al. | ............... 242/384.2 |
| 5,687,926 A | * | 11/1997 | Park et al. | |
| 5,820,060 A | * | 10/1998 | Yano | |
| 5,918,717 A | * | 7/1999 | Fohl | |
| 6,390,403 B2 | * | 5/2002 | Specht | .................... 242/390.8 |
| 6,681,914 B2 | * | 1/2004 | Schmid | |
| 2003/0052209 A1 | | 3/2003 | Honl et al. | |

FOREIGN PATENT DOCUMENTS

| | | |
|---|---|---|
| DE | 201 15 316 U1 | 3/2002 |
| EP | 1 195 536 A1 | 4/2002 |

* cited by examiner

Primary Examiner—William A. Rivera
(74) Attorney, Agent, or Firm—Nixon Peabody LLP

(57) ABSTRACT

A webbing winding device in which a breadth dimension of a torque limiter is less than an axial direction dimension of an external gear. A rotation disc, the torque limiter or the like is wholly disposed, along a radial direction of the external gear, between the external gear and a peripheral wall of a baseplate. Further, members such as pawls, a rotation disc and the like are disposed, along a radial direction of the peripheral wall, between the peripheral wall and an adaptor, and these members are accommodated at an inner side of the external gear. Consequently, a thickness dimension (axial direction dimension) of a clutch is practically the same as an axial direction dimension of the external gear, and this is extremely thin.

7 Claims, 18 Drawing Sheets

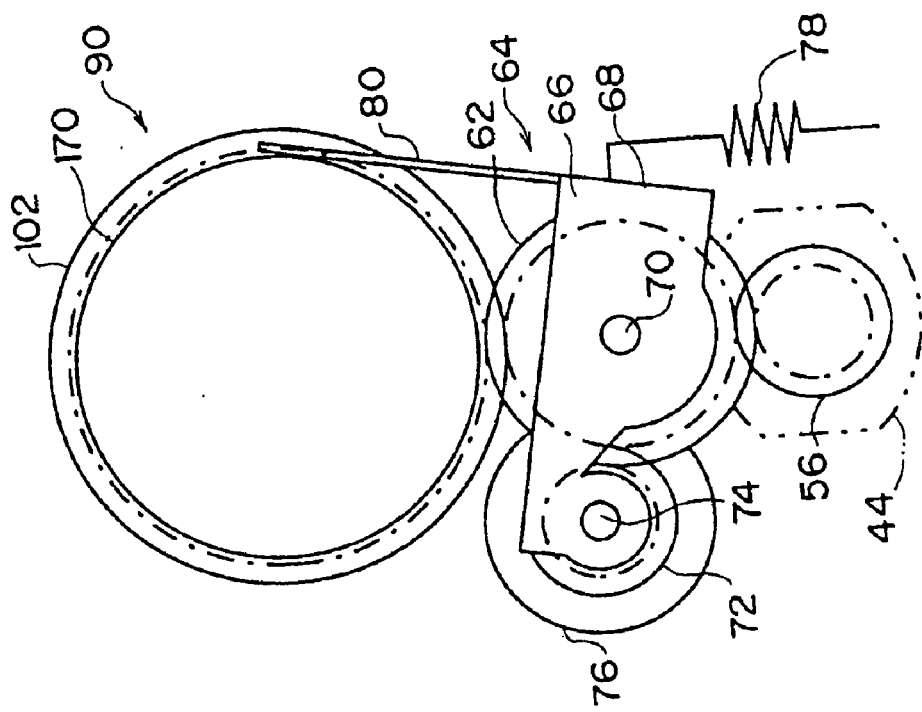
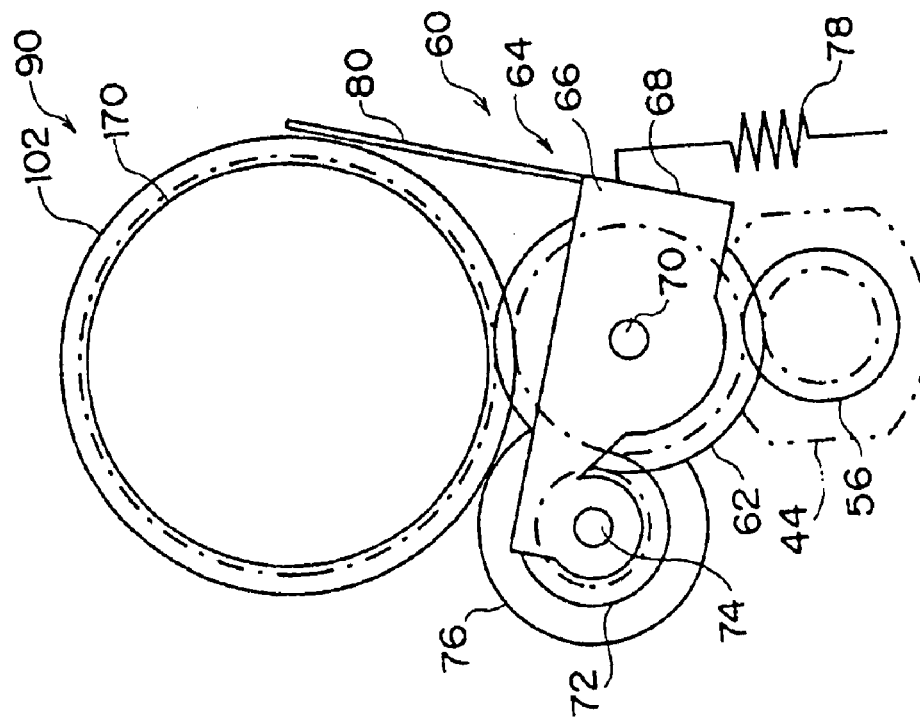

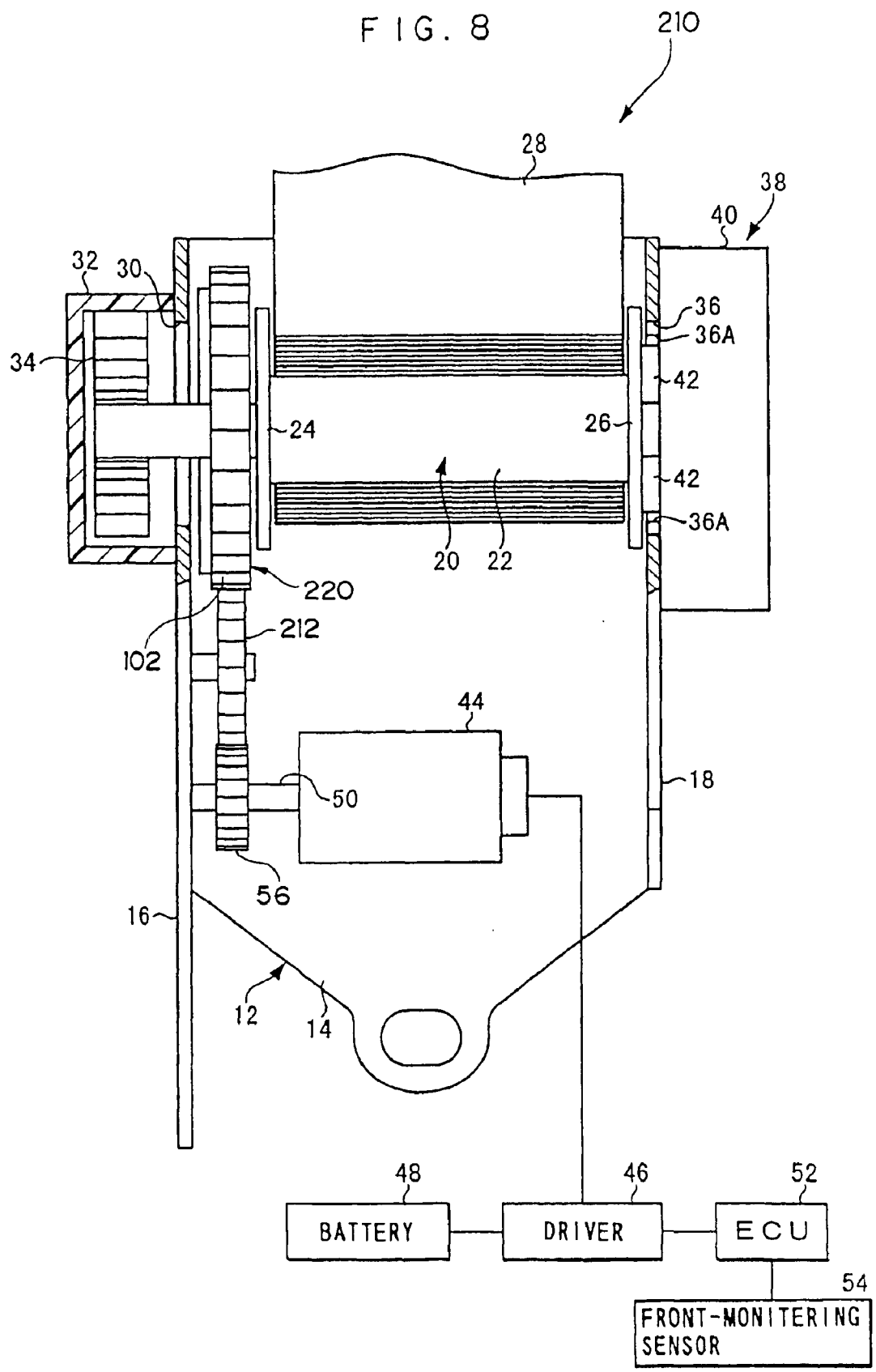

WEBBING WINDING DEVICE AND CLUTCH MECHANISM

CROSS-REFERENCE TO RELATED APPLICATION

This application claims priority under 35 USC 119 from Japanese patent application, No. 2002-203140, the disclosure of which is incorporated by reference herein.

BACKGROUND OF THE INVENTION

1. Field of the Invention

The present invention relates to a webbing winding device which structures a seat belt apparatus of a vehicle or the like, and to a clutch mechanism used for switching between transmission and disconnection of driving force of a motor or the like.

2. Description of the Related Art

A seat belt apparatus, which restrains a body of an occupant sitting at a seat of a vehicle with a long belt-form webbing belt, is equipped with a webbing winding device fixed to a body of the vehicle sideward of the seat. The webbing winding device is equipped with, for example, a spool (winding shaft) whose axial direction is substantially along a front-rear direction of the vehicle. A length direction proximal end side of the webbing belt is anchored at this spool. The spool accommodates the webbing belt in a state in which the webbing belt is wound on at an outer peripheral portion of the spool in a layered form.

An urging member such as a torsion coil spring or the like is provided at the webbing winding device, and urges the spool in a winding direction for winding up the webbing belt. The webbing belt is wound on and accommodated by urging force of this urging member, and slackness or the like of the webbing belt in a state in which the webbing belt is applied to the body of the occupant is eliminated by the urging force of the urging member.

This type of webbing winding device is a structure at which a tongue plate is provided at a length direction intermediate portion of the webbing belt. When the tongue plate is pulled, against the urging force of the urging member, the webbing belt that has been wound on at the spool is drawn out. In this state, the tongue plate is retained at a buckle device which is provided sideward of the seat, at a side thereof opposite to the side at which the webbing winding device is disposed. Thus, the webbing belt can be applied to the occupant.

Further, mechanisms have been considered in which, at a time of rapid deceleration of the vehicle or the like, for the purpose of more strongly restraining the body of the occupant, for example, a driving force of a motor is applied to the spool at the time of rapid deceleration of the vehicle or the like. The spool is rotated in the winding direction by a certain amount by this driving force, and raises tension of the webbing belt.

In this type of webbing winding device, if the spool and a drive shaft of the motor are simply coupled (in the mechanical terms) at usual times, such a coupling becomes a hindrance to rotation of the spool when the webbing belt is drawn out and wound up for usual purposes, and unnecessary loads may be applied to the motor. Accordingly, a clutch mechanism is provided between the drive shaft and the spool.

Further, in a structure which, as described above, supplies driving force of the motor to the spool and winds up the webbing belt with this driving force at a time of rapid deceleration of the vehicle, if a rotation amount of the motor is large, and rotation of the spool in the winding direction is excessive, the body of the occupant will be constricted by excessive force from the webbing belt.

This state, in which the webbing belt constricts the body of the occupant more than necessary while the webbing belt is applied, is a state in which rotation of the spool in the winding direction is hindered by the body of the occupant. Accordingly, employment of a "torque limiter", which releases the mechanical coupling between the motor and the spool in a state in which the rotation of the spool is hindered, when a rotational torque applied to the spool from the motor is at or above a predetermined magnitude, has been considered as one means for preventing this excessive constriction.

Now, reductions in size and weight of devices mounted at vehicles, such as webbing winding devices, are constantly being demanded. However, when a torque limiter is provided in addition to a centrifugal clutch as described above, weight of the webbing winding device is raised and the webbing winding device becomes larger.

SUMMARY OF THE INVENTION

In consideration of the circumstances described above, an object of the present invention is to provide a webbing winding device which, in spite of including both a clutch mechanism and a torque limiter, enables reductions in size and weight, and to provide a clutch mechanism which includes a torque limiter and is small, thin and light.

In a first aspect of the present invention, a webbing winding device includes: a winding shaft at which a proximal end portion of a long belt-form webbing belt is anchored, the winding shaft winding the webbing belt in a layered form at a periphery thereof when the winding shaft is rotated in a winding direction one way about an axis thereof, and the winding shaft rotating in a drawing out direction, which is opposite to the winding direction, while the webbing belt is drawn out by the webbing belt being pulled to a distal end side thereof; a slave shaft coaxially and integrally attached to the winding shaft; a motor side rotating body including a peripheral wall, at an inner side of which the slave shaft is disposed at a vicinity of an axial center of the motor side rotating body, the motor side rotating body being coaxially and relatively rotatable with respect to the slave shaft, and the motor side rotating body receiving driving force from driving means for rotating about the axial center of the slave shaft; a ring-form intermediate rotating body disposed at the inner side of the peripheral wall, between the slave shaft and the peripheral wall, the intermediate rotating body being relatively rotatable about the axial center of the motor side rotating body with respect to both the motor side rotating body and the slave shaft; a coupling member disposed between the intermediate rotating body and an outer peripheral portion of the slave shaft, the coupling member mechanically coupling the intermediate rotating body with the slave shaft in conjunction with rotation of the motor side rotating body; and a torque limiter disposed between an inner peripheral portion of the peripheral wall and an outer peripheral portion of the intermediate rotating body, the torque limiter including one portion which is anchored at one of the peripheral wall and the intermediate rotating body and another portion which is engaged with the other of the peripheral wall and the intermediate rotating body, the torque limiter mechanically coupling the peripheral wall with the intermediate rotating body and the engagement being released by a relative rotation force of the peripheral wall with respect to the intermediate rotating body of at least a predetermined value.

In the webbing winding device described above, the proximal end portion of the long belt-form webbing belt is anchored at the winding shaft. When the winding shaft is rotated in the winding direction the one way about the axis, the webbing belt is wound on the outer peripheral portion of the winding shaft in the layered form, from the proximal end side thereof. Thus, the webbing belt is accommodated.

When the distal end side of the webbing belt in this accommodated state is pulled on, the webbing belt which has been wound up at the winding shaft (that is, in the accommodated state) is drawn out by a consequent tension force, while the winding shaft rotates in the drawing out direction opposite to the winding direction. Hence, the webbing belt that has been drawn out is applied to the body of an occupant, and the body of the occupant is restrained by the webbing belt.

The slave shaft is coaxially and integrally provided at the winding shaft of this webbing winding device. The peripheral wall, which structures the motor side rotating body, is provided peripherally to the slave shaft. When the driving force of the driving means is supplied to the motor side rotating body, the motor side rotating body rotates about the axial center thereof (that is, about the axial center of the slave shaft).

The intermediate rotating body is provided between the peripheral wall of the motor side rotating body and the slave shaft, to be relatively rotatable with respect to both the motor side rotating body and the slave shaft. The torque limiter is provided between the inner peripheral portion of the peripheral wall of the motor side rotating body and the outer peripheral portion of the intermediate rotating body. The one portion of the torque limiter is anchored at either of the peripheral wall of the motor side rotating body and the intermediate rotating body, and the other portion of the torque limiter is anchored at the other of the motor side rotating body and the intermediate rotating body. Thus, the peripheral wall of the motor side rotating body is mechanically coupled with the intermediate rotating body via the torque limiter. Consequently, in essence, the intermediate rotating body rotates when the motor side rotating body rotates.

The coupling member is disposed between the inner peripheral portion of the intermediate rotating body and the outer peripheral portion of the slave shaft. When the motor side rotating body rotates, the coupling member couples the intermediate rotating body with the slave shaft in conjunction with this rotation of the motor side rotating body. Hence, in this state, the motor side rotating body is mechanically coupled to the slave shaft via the torque limiter, the intermediate rotating body and the coupling member. Thus, the rotation of the motor side rotating body is transmitted to the slave shaft via the torque limiter, the intermediate rotating body and the coupling member, and the slave shaft rotates.

If this rotation of the slave shaft is rotation in the winding direction, rotation force in the winding direction is applied to the winding shaft, which is integral with the slave shaft, and the webbing belt starts to wind up. Accordingly, if the webbing belt is in the applied state, looseness (known as "slack") or the like of the webbing belt is forcibly wound up at the winding shaft, restraining force from the webbing belt is enhanced, and the webbing belt can more assuredly hold the body of the occupant.

On the other hand, if the rotation of the slave shaft is in the drawing direction, rotation force in the drawing direction is applied to the winding shaft. Accordingly, if the webbing belt is in the applied state, the webbing belt is loosened, and a sensation of pressure felt by the occupant due to the application of the webbing belt is alleviated.

The coupling member couples the intermediate rotating body with the slave shaft only in conjunction with rotation of the motor side rotating body. If some external force acts on the winding shaft and hence the slave shaft rotates, when rotation force is not applied at the motor side rotating body, the coupling of the intermediate rotating body with the slave shaft by the coupling member is released.

Accordingly, if the slave shaft rotates alone as described above, the rotation of the slave shaft is not transmitted to the intermediate rotating body and hence to the motor side rotating body, and rotation force of the slave shaft is not transmitted to the driving means. Therefore, failures and the like occurring at the driving means because of rotation forces of the winding shaft being transmitted to the driving means in accordance with, for example, the webbing belt being drawn out by the occupant and the like can be avoided.

On the other hand, when the rotation force of the driving means is applied to the motor side rotating body, this rotation force is transmitted to the winding shaft via the torque limiter, the intermediate rotating body, the coupling member and the slave shaft, as described above. Here, if an external force counteracting this rotation force acts on the winding shaft, slave shaft and the like, the winding shaft, slave shaft and the like will not rotate.

In consequence, the intermediate rotating body coupled to the slave shaft by the coupling member will not rotate, and the motor side rotating body coupled to the intermediate rotating body by the torque limiter will not rotate, either. In the webbing winding device with this structure, the intermediate rotating body is relatively rotatable with respect to both the slave shaft and the motor side rotating body, but because of the coupling by the torque limiter, the motor side rotating body and the intermediate rotating body rotate integrally.

Here, in a state in which the aforementioned rotation force is at or above the predetermined value, and an external force counteracting this rotation force acts on the slave shaft, winding shaft and the like, a relative rotation force at or above the predetermined value is generated between the peripheral wall of the motor side rotating body and the intermediate rotating body. When this relative rotational force of at least the predetermined value is generated between the peripheral wall of the motor side rotating body and the intermediate rotating body, the engagement of the torque limiter with the aforementioned other of the peripheral wall of the motor side rotating body and the intermediate rotating body is released.

As a result, the mechanical coupling of the torque limiter with the other of the peripheral wall of the motor side rotating body and the intermediate rotating body, and hence the mechanical coupling of the motor side rotating body with the intermediate rotating body, is released. In this state, because the rotation force of the motor side rotating body is not transmitted to the intermediate rotating body, the motor side rotating body rotates alone.

In this webbing winding device, the mechanical coupling between the peripheral wall of the motor side rotating body and the intermediate rotating body can be released when a relative rotational force of at least the predetermined value is generated between the peripheral wall of the motor side rotating body and the intermediate rotating body. Therefore, in a case in which, for example, it is likely that the occupant to whom the webbing belt is applied would experience an excessive sensation of pressure if the winding shaft acts to wind up the webbing belt excessively by the rotation force of the driving means, the winding up of the webbing belt can be interrupted by the body of the occupant resisting the winding force winding up the webbing belt (which is to say, the rotation force of the driving means).

Thus, excessive winding of the webbing belt can be prevented as described above. Moreover, in such a state, because the mechanical coupling of the motor side rotating body with the intermediate rotating body can be released and the motor side rotating body rotated alone by the rotating force received from the driving means, application of excessive loads to the driving means by forcible stoppages of rotation will not occur. As a result, the driving means can be conserved.

This webbing winding device can provide various operations and effects due to the inclusion of the coupling member, torque limiter and the like as described above. In this webbing winding device, the intermediate rotating body is disposed between the inner peripheral portion of the peripheral wall structuring the motor side rotating body and the outer peripheral portion of the slave shaft. Further, the coupling member is disposed between the intermediate rotating body and the one of the motor side rotating body and the slave shaft (that is, either one of between the inner peripheral portion of the peripheral wall of the motor side rotating body and the outer peripheral portion of the intermediate rotating body and between the outer peripheral portion of the slave shaft and the inner peripheral portion of the intermediate rotating body). Further still, the torque limiter is disposed between the intermediate rotating body and the other of the motor side rotating body and the slave shaft (that is, the other of between the inner peripheral portion of the peripheral wall of the motor side rotating body and the outer peripheral portion of the intermediate rotating body and between the outer peripheral portion of the slave shaft and the inner peripheral portion of the intermediate rotating body).

Accordingly, a clutch mechanism of the present webbing winding device formed by the structures described above can be kept within a dimension of the motor side rotating body along a direction intersecting the axis of the peripheral wall of the motor side rotating body (i.e., a radial direction). Moreover, the above-described structures are superposed along the axial direction of the peripheral wall. Thus, a dimension of the clutch mechanism of this webbing winding device along the axial direction of the peripheral wall can be made smaller. Consequently, great reductions in size and thickness of the whole of the webbing winding device can be provided.

In a second aspect of the present invention, the torque limiter includes a resilient member, the resilient member is formed with one of a substantial plate form with a thickness direction along a direction intersecting the axis of the motor side rotating body and a thin-walled tubular form including an internal diametric dimension greater than an external diametric dimension of the intermediate rotating body and an external diametric dimension smaller than an internal diametric dimension of the peripheral wall, the resilient member is disposed between the inner peripheral portion of the peripheral wall and the outer peripheral portion of the intermediate rotating body with the one portion being anchored at the one of the inner peripheral portion of the peripheral wall and the outer peripheral portion of the intermediate rotating body, and the other portion resiliently engaging to the side of the other of the inner peripheral portion of the peripheral wall and the outer peripheral portion of the intermediate rotating body by urging force of the other portion, and the resilient engagement is released at a time at which the relative rotation force counteracts the urging force.

According to the webbing winding device with the structure described above, the resilient member, whose thickness direction is along the direction intersecting the axis of the motor side rotating body, is disposed between the inner peripheral portion of the peripheral wall structuring the motor side rotating body and the outer peripheral portion of the intermediate rotating body. The one portion of the resilient member is anchored at either one of the inner peripheral portion of the peripheral wall and the outer peripheral portion of the intermediate rotating body. Thus, the resilient member rotates integrally when the either one of the motor side rotating body and the intermediate rotating body rotates.

Correspondingly, the other portion of the resilient member is resiliently engaged at the other of the inner peripheral portion of the peripheral wall and the outer peripheral portion of the intermediate rotating body. Essentially, the other portion of the resilient member is mechanically coupled to this other of the two peripheral portions of the motor side rotating body and the intermediate rotating body. Accordingly, when the motor side rotating body rotates, rotation force is directly transmitted to the intermediate rotating body via the resilient member, and the intermediate rotating body rotates.

However, if the relative rotation force of the motor side rotating body with respect to the intermediate rotating body is at or above the predetermined value and the relative rotation force counteracts a resilient force (spring force) at the aforementioned other portion of the resilient member, the resilient engagement between the other portion of the resilient member and the other of the two peripheral portions is released. Thus, the mechanical coupling of the motor side rotating body with the intermediate rotating body via the resilient member is released. Hence, the rotation force of the motor side rotating body is not transmitted to the intermediate rotating body, and the motor side rotating body rotates in a state in which the intermediate rotating body has stopped.

In this webbing winding device, the torque limiter is the resilient member described above. Here, the resilient member may be formed in the plate form whose thickness direction is along the direction intersecting the axis of the motor side rotating body, or in the thin-walled tubular form whose internal diametric dimension is larger than the external diametric dimension of the intermediate rotating body and whose external diametric dimension is smaller than the internal diametric dimension of the peripheral wall of the motor side rotating body. Thus, the resilient member which is a torque limiter having either the plate form or the tubular form is a structure which can be interposed in a gap between the peripheral wall of the motor side rotating body and the intermediate rotating body.

That is, as long as dimensions are specified such that a gap large enough for interposition of the resilient member can be formed between the peripheral wall of the motor side rotating body and the intermediate rotating body, the motor side rotating body need not be made any larger than necessary. Therefore, the clutch mechanism of the present webbing winding device, which is formed with the motor side rotating body, the torque limiter, the intermediate rotating body, the coupling member and the slave shaft, can be made smaller and lighter as a whole.

Furthermore, because the resilient member has the plate form or the tubular form as described above, the resilient force (spring force) can be appropriately adjusted by specifying a thickness direction dimension thereof, without a breadth dimension thereof (a dimension along the axial direction of the motor side rotating body and the intermediate rotating body) being made larger. Thus, because the resilient force can be obtained without making the breadth dimension larger, the resilient member can be accommodated at the inner side of the peripheral wall of the motor side rotating body without an axial direction dimension of the peripheral wall of the motor side rotating body being made any larger than necessary. Consequently, a great reduction in thickness of the clutch mechanism of the present webbing winding device as a whole is provided.

In a third aspect of the present invention, a webbing winding device according to the aspects described above further includes: a coupling compelling member disposed at the inner side of the peripheral wall to be coaxially relatively rotatable with respect to both the motor side rotating body and the slave shaft, relative rotation of the coupling compelling member with respect to the motor side rotating body causing the coupling compelling member to move and mechanically couple the intermediate rotating body with the slave shaft; and an urging member disposed at the inner side of the peripheral wall to be capable of rotating to follow rotation of the motor side rotating body, the urging member urging the coupling compelling means in the direction of rotation of the motor side rotating body.

In a webbing winding device with the structure described above, when rotation force from the driving means is applied at the motor side rotating body and the motor side rotating body rotates, the urging member rotates. Further, because the urging member urges the coupling compelling member in the direction of the rotation of the motor side rotating body, the coupling compelling member is rotated by urging force received from the urging member. Accordingly, in this state, although the motor side rotating body is rotating, because the coupling compelling member is rotating to follow the motor side rotating body, relative rotation of the motor side rotating body and the coupling compelling member does not occur.

Here, in a case in which, because of inertia of the coupling compelling member itself or because of an external force other than the urging force from the urging member, the coupling compelling member resists the urging force of the urging member and does not rotate, or the coupling compelling member rotates but a difference occurs between rotation amounts of the coupling compelling member and the motor side rotating body, a relative rotation between the motor side rotating body and the coupling compelling member is caused. Accordingly, when this relative rotation between the motor side rotating body and the coupling compelling member occurs, the coupling compelling member operates the coupling member and the slave shaft is mechanically coupled with the intermediate rotating body. Thus, the slave shaft, and hence the winding shaft, is rotated.

In a fourth aspect of the present invention, a clutch mechanism includes: an outer side rotating body including an outer side peripheral wall formed in a tubular form with arbitrary outer peripheral and inner peripheral forms; an intermediate rotating body including an intermediate peripheral wall disposed at an inner side of the outer side peripheral wall and formed in a tubular form with arbitrary outer peripheral and inner peripheral forms, an external diametric dimension of the intermediate peripheral wall being smaller than an internal diametric dimension of the outer side peripheral wall, and the intermediate rotating body being relatively rotatable about an axial center of the outer side rotating body with respect to the outer side rotating body; an inner side rotating body provided at an inner side of the intermediate peripheral wall to be relatively rotatable about the axial center of the outer side rotating body with respect to both the outer side rotating body and the intermediate rotating body; a coupling member disposed between the intermediate peripheral wall and one of the outer side peripheral wall and the inner side rotating body, the coupling member, in accordance with a predetermined condition, mechanically coupling the one of the rotating bodies with the intermediate peripheral wall and causing the one of the rotating bodies and the intermediate rotating body to rotate integrally, and releasing the mechanical coupling when the predetermined condition ceases to apply; and a torque limiter disposed between the intermediate peripheral wall and the other of the outer side peripheral wall and the inner side rotating body, the torque limiter integrally coupling the other of the rotating bodies with the intermediate peripheral wall, and releasing the coupling of the other of the rotating bodies with the intermediate peripheral wall when a relative rotation force of at least a predetermined magnitude is generated at a time at which the intermediate peripheral wall acts to relatively rotate with respect to the other of the rotating bodies.

In a clutch mechanism with the structure described above, the outer side rotating body or the inner side rotating body serves as the motor side rotating body. When rotation force is applied to this motor side rotating body, the motor side rotating body rotates about the axial center thereof. Here, the intermediate rotating body, which is disposed at the inner side of the outer side peripheral wall structuring the outer side rotating body, is basically integrally coupled with the other of the outer side rotating body and the inner side rotating body by the torque limiter, which is provided therebetween. Consequently, in basic terms, the other of the outer side rotating body and the inner side rotating body can rotate integrally with the intermediate rotating body.

However, when the predetermined condition is not satisfied, the coupling member, which is provided between the intermediate rotating body and the one of the outer side rotating body and the inner side rotating body, releases mechanical coupling between the one of the two rotating bodies and the intermediate rotating body.

Consequently, transmission of rotation force from the one of the outer side rotating body and the inner side rotating body to the intermediate rotating body is not implemented. Therefore, in this state, the rotation of the motor side rotating body is not transmitted to a following side rotating body, which is the one of the outer side rotating body and the inner side rotating body that is not the motor side rotating body, and the following side rotating body does not rotate.

In contrast, when the predetermined condition, such as, for example, the motor site rotating body rotating at a rotation speed equal to or greater than a predetermined value, a direction of rotation of the motor side rotating body being a particular direction or the like, is satisfied, the one of the outer side rotating body and the inner side rotating body is mechanically coupled with the intermediate rotating body by the coupling member. Accordingly, the rotation of the motor side rotating body is transmitted to the following side rotating body through one of the torque limiter and the coupling member, the intermediate rotating body, and the other of the torque limiter and the coupling member, in that order.

In this clutch mechanism, the outer side rotating body, the intermediate rotating body and the inner side rotating body are fundamentally relatively rotatable. Thus, rotation is transmitted by coupling with the coupling member and the torque limiter.

Now, even in a state in which, for example, the one of the outer side rotating body and the inner side rotating body is mechanically coupled with the intermediate rotating body by the coupling member, some external force may act on the following side rotating body, and the following side rotating body may resist the rotation of the motor side rotating body.

In such a case, if the rotation force of the motor side rotating body becomes excessive, and a relative rotational force between the intermediate rotating body and the other of the outer side rotating body and the inner side rotating body, which are coupled by the torque limiter, is equal to or greater than a predetermined value, the mechanical coupling by the torque limiter is released.

Consequently, the rotation force of the motor side rotating body is not transmitted to the following side rotating body. As a result, problems that could occur due to the application of rotation forces to the following side rotating body in a forcibly static state can be assuredly prevented.

In this clutch mechanism, the intermediate rotating body is disposed between the inner peripheral portion of the outer side peripheral wall structuring the outer side rotating body and the outer peripheral portion of the inner side rotating body. The coupling member is disposed between the intermediate rotating body and the one of the outer side rotating body and the inner side rotating body (that is, either one of between the inner peripheral portion of the outer side peripheral wall of the outer side rotating body and the outer peripheral portion of the intermediate peripheral wall of the intermediate rotating body and between the outer peripheral portion of the inner side rotating body and the inner peripheral portion of the intermediate peripheral wall of the intermediate rotating body). Further, the torque limiter is disposed between the intermediate rotating body and the other of the outer side rotating body and the inner side rotating body (that is, the other of between the inner peripheral portion of the outer side peripheral wall of the outer side rotating body and the outer peripheral portion of the intermediate peripheral wall of the intermediate rotating body and between the outer peripheral portion of the inner side rotating body and the inner peripheral portion of the intermediate peripheral wall of the intermediate rotating body).

Accordingly, a dimension of this clutch mechanism along a direction intersecting the axis of the outer side peripheral wall (a radial direction) can be kept within a dimension along this direction of the outer side rotating body. Moreover, because the structures of the clutch mechanism are disposed as described above, the structures are superposed along the axial direction of the outer side peripheral wall. Thus, a great reduction in size and thickness can be provided to, for example, various devices to which this clutch mechanism is applied.

BRIEF DESCRIPTION OF THE DRAWINGS

FIG. 7A is a side view showing general structure of the braking mechanism, showing a usual state.

FIG. 7B is a side view showing general structure of the braking mechanism, showing a sliding state.

FIG. 8 is a front view showing general structure of a webbing winding device relating to a second embodiment of the present invention.

DETAILED DESCRIPTION OF THE INVENTION

Structure of First Embodiment

Overall Structure of Webbing Winding Device 10

Figure 5:
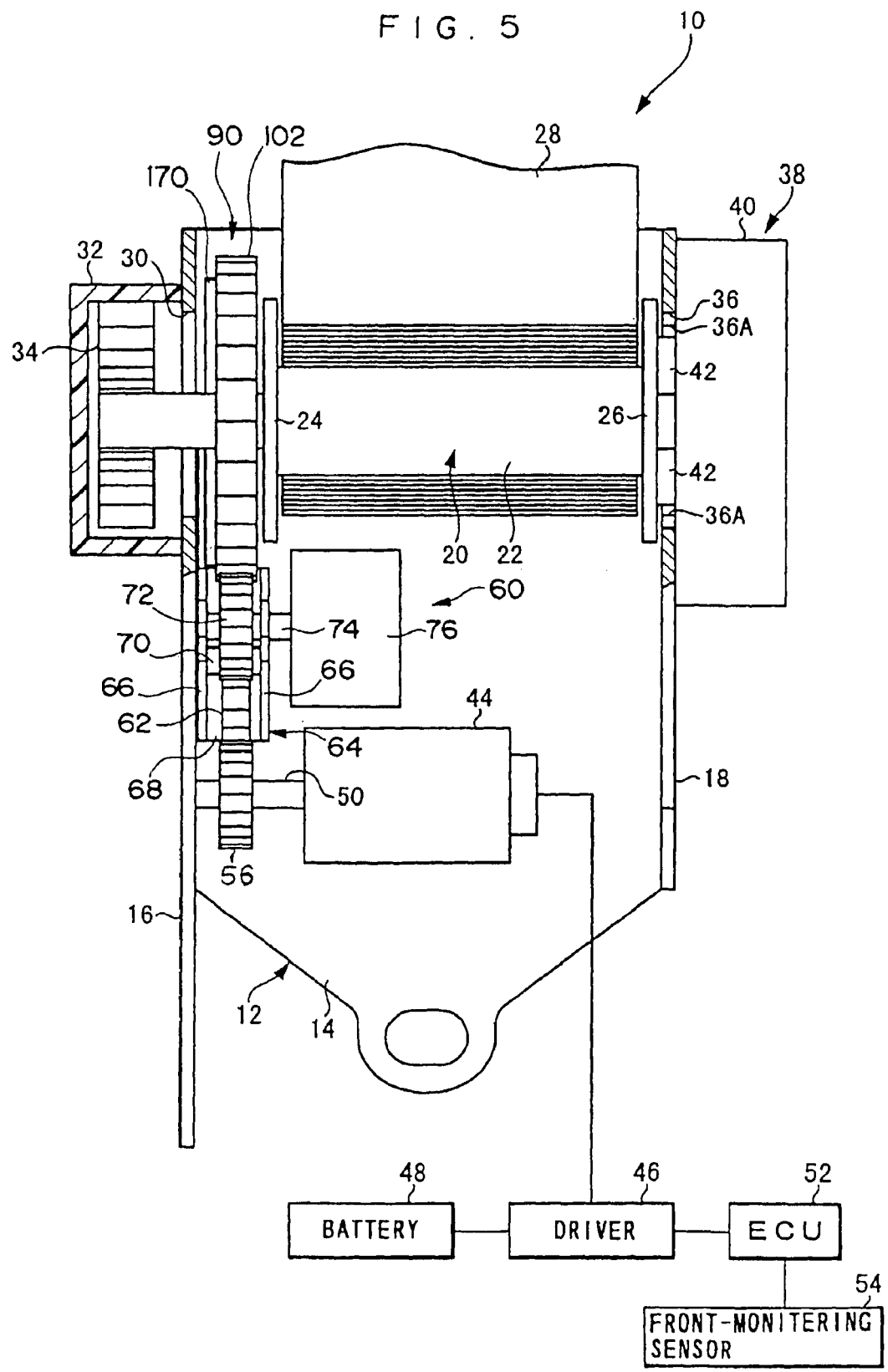
FIG. 5 is a front view showing general structure of the webbing winding device relating to the first embodiment of the present invention.

FIG. 5 shows a sectional view illustrating overall structure of a webbing winding device 10 relating to a first embodiment of the present invention. As shown in FIG. 5, the webbing winding device 10 is provided with a frame 12. The frame 12 is provided with a substantially plate-form back plate 14. The back plate 14 is fixed to a vehicle body by unillustrated fastening means such as a bolt or the like. Thus, this webbing winding device 10 is structured to be attached to the vehicle body. From two ends of the back plate 14 in a width direction thereof, a pair of leg plates 16 and 18 extend in parallel with one another. A spool 20 is rotatably disposed at these leg plates 16 and 18. The spool 20 is fabricated by die-casting or the like, and serves as a winding shaft.

The spool 20 is structured by a substantially cylindrical spool main body 22 and a pair of flange portions 24 and 26, which are respectively formed in substantially circular plate shapes at two end portions of the spool main body 22. Thus, the spool 20 as a whole forms a drum shape.

At the spool main body 22, a proximal end portion of a webbing belt 28 formed in a long belt shape is fixed between the flange portions 24 and 26. When the spool 20 is rotated one way around an axis thereof, the webbing belt 28 is wound, from a proximal end portion thereof, onto an outer peripheral portion of the spool main body 22 in a layered form. When the webbing belt 28 is drawn out, from a distal end side thereof, the webbing belt 28 that has been wound on the outer peripheral portion of the spool main body 22 is drawn out. In accordance therewith, the spool 20 rotates in the opposite direction to the direction of rotation when the webbing belt 28 was wound on (which is herebelow referred to as "the winding direction" for the sake of convenience). (Herebelow, the direction of rotation of the spool 20 when the webbing belt 28 is drawn out is referred to as "the drawing direction", for the sake of convenience.)

At a side of the flange portion 24 which is opposite to a side thereof at which the flange portion 26 is disposed, one end of the spool 20 passes through a round hole 30, which is formed in the leg plate 16, substantially coaxially with the round hole 30 and protrudes to outside the frame 12. A case 32 is disposed at an outer side of the leg plate 16 side of the frame 12. The case 32 is disposed to face the leg plate 16 along the axial direction of the spool 20, and is fixed to the leg plate 16. The case 32 is wholly open toward the leg plate 16 side thereof. The one end of the spool 20 that is passed through the round hole 30 enters into the interior of the case 32, and is rotatably supported by the case 32.

A spiral spring 34 is disposed at the interior of the case 32. An end portion at a spiral direction outer side of the spiral spring 34 is anchored at the case 32. An end portion at the spiral direction inner side of the spiral spring 34 is anchored at the spool 20. When the spool 20 is rotated in the drawing direction, from a neutral state in which no particular load is applied to the spiral spring 34, a winding direction urging force is generated in the spiral spring 34 and urges the spool 20 in the winding direction. Thus, in basic terms, when a tension force applied to the webbing belt 28 for drawing the webbing belt 28 out from the spool 20 is released, the urging force of the spiral spring 34 rotates the spool 20 in the winding direction. Thus, this structure winds the webbing belt 28 onto the spool 20.

At a side of the flange portion 26 which is opposite to a side thereof at which the flange portion 24 is disposed, another end of the spool 20 passes through a ratchet hole 36 formed in the leg plate 18, substantially coaxially with the ratchet hole 36, and protrudes to outside the frame 12. Inward teeth 36A are formed at the ratchet hole 36. A lock mechanism 38 is disposed at an outer side of the leg plate 18 side of the frame 12. The lock mechanism 38 is provided with a case 40. The case 40 is disposed to face the leg plate 18 along the axial direction of the spool 20, and is fixed to the leg plate 18. Principal elements structuring the lock mechanism 38, such as an unillustrated inertial plate, outward gear, acceleration sensor and the like, are accommodated at the interior of the case 40. With this structure, the inertial plate in the case 40 rotates relatively with respect to the spool 20 if the spool 20 suddenly rotates in the winding direction, and the inertial plate in the case 40 is forcibly rotated relatively with respect to the spool 20 if the acceleration sensor detects a state of rapid deceleration of the vehicle.

A pair of lock plates 42 are provided inside the ratchet hole 36. These lock plates 42 are supported at a lock base which is provided in the case 40 and rotates integrally with the spool 20. With this structure, when the inertial plate in the case 40 rotates relatively in the drawing direction with respect to the lock base, the lock plates 42 are guided by guide portions, which are formed in the lock base, and approach an inner periphery portion of the ratchet hole 36. Hence, outward teeth formed at the lock plates 42 mesh with the inward teeth 36A formed at the inner periphery portion of the ratchet hole 36. Thus, with this structure, when the outward teeth formed at the lock plates 42 mesh with the inward teeth 36A formed at the inner periphery portion of the ratchet hole 36, rotation of the lock base in the drawing direction is restricted, and rotation of the spool 20 is restricted.

A motor 44, which serves as driving means, is disposed between the leg plate 16 and the leg plate 18, downward of the spool 20. The motor 44 is electrically connected to a battery 48 mounted in the vehicle, via a driver 46. In this structure, when electric current flows to the motor 44 from the battery 48 via the driver 46, the motor 44 forward-rotates or reverse-rotates an output shaft 50. The driver 46 is connected to an ECU (electric control unit) 52, which is structured by a microcomputer or the like, and the ECU 52 is connected to a forward surveillance sensor 54.

The forward surveillance sensor 54 is disposed at a vicinity of a front end portion of the vehicle. The forward surveillance sensor 54 radiates an infra-red ray to frontward of the vehicle, and collects the infra-red ray subsequent to reflection thereof from another vehicle (running or stationary) or an obstacle or the like frontward of the vehicle (herebelow, for the sake of convenience, the term "obstacle" includes running and stationary vehicles). On the basis of a time taken from when the forward surveillance sensor 54 emitted the infra-red light ray to when the forward surveillance sensor 54 collected the infra-red ray, the ECU 52 calculates a distance forward to the obstacle.

The ECU 52 operates the driver 46 on the basis of electrical signals outputted from the forward surveillance sensor 54, and thus controls the motor 44.

Structure of Brake Mechanism 60

Figure 6:
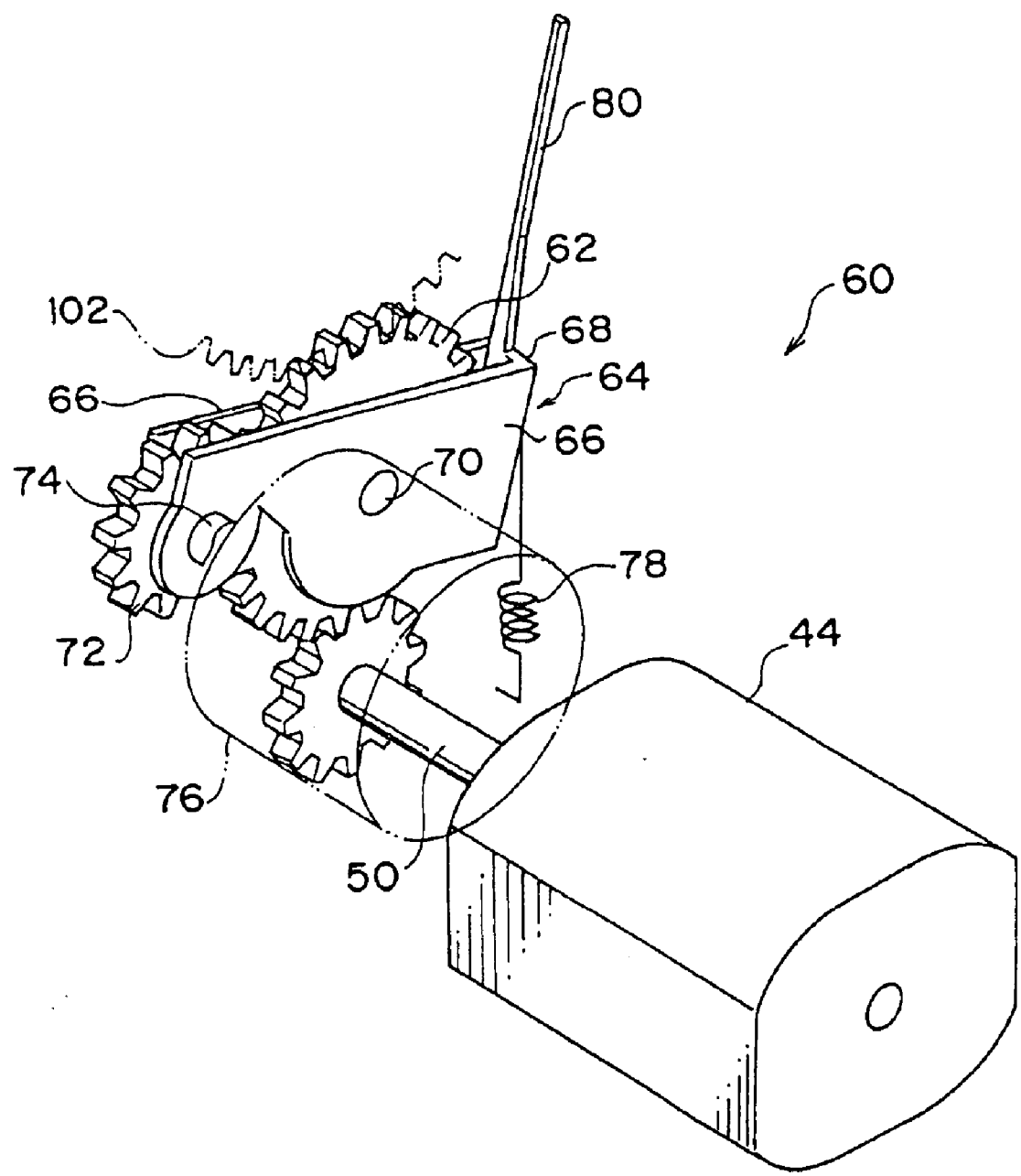
FIG. 6 is a perspective view showing general structure of a braking mechanism of the webbing winding device relating to the first embodiment of the present invention.

A gear 56 is coaxially and integrally provided at a distal end portion of the output shaft 50 of the motor 44. The 56 meshes with an external gear 62, which structures a braking mechanism 60. As shown in FIGS. 6 to 7B, the braking mechanism 60 is equipped with a frame 64. The frame 64 is provided with a pair of side walls 66, which face one another along a facing direction of the leg plates 16 and 18. These side walls 66 are integrally joined by a back plate 68 at a rear face side of the frame 12. In plan view, the side walls 66 as a whole substantially form a recess shape which opens toward a front face side of the frame 12.

The gear 62 is provided such that a rotation center thereof is disposed between the side walls 66. The gear 62 is rotatably supported at a shaft 70, which passes through the side walls 66 and is supported at the leg plate 16 of the frame 12. The gear 62 has a greater diameter than the gear 56, and a greater number of teeth. Accordingly, rotation of the gear 56 is reduced in speed by being transmitted to the gear 62. A gear 72 is disposed at a side of the gear 62 which is opposite to a side thereof at which the back plate 68 of the frame 64 is disposed.

In a state in which the gear 72 is rotatably supported at a shaft 74, both ends of which are supported at the side walls 66, the gear 72 meshes with the gear 62. Accordingly, when rotation of the gear 62 is transmitted, the gear 72 can rotate about the axial center of the gear 62. Furthermore, the shaft 74 which axially supports the gear 72 extends inward of the frame 12. A weight 76, which is formed in a circular column shape which is substantially coaxial with the shaft 74, is integrally fixed to a distal end portion of the shaft 74. Thus, the weight 76 is integral with the gear 72 via the shaft 74, and weight of the gear 72 itself and weight of the weight 76 both act on the gear 72.

One end of a tension coil spring 78 is anchored at the back plate 68 of the frame 64. Another end of the tension coil spring 78 is fixed to the leg plate 16 at a lower side relative to the one end of the tension coil spring 78. Urging force of this tension coil spring 78 is greater than a gravitational force due to the weight which acts on the gear 72 (based on the weight of the gear 72 itself and the weight of the weight 76). The urging force of the tension coil spring 78 acts so as to pull down the back plate 68 side of the frame 64, acting against the gravitational force acting on the gear 72.

A braking plate 80 protrudes from an upper end portion of the back plate 68 in a narrow-width plate form. When the braking plate 80 abuts against an outer peripheral portion of a friction ring 170 of a later-described clutch 90, which serves as a clutch mechanism, rotation of the friction ring 170 is restrained by friction.

Structure of Clutch 90

Meanwhile, as shown in FIG. 5, the clutch 90 is provided sideward of the gear 62 in a radial direction thereof. Herebelow, the clutch 90 will be described using FIGS. 1 to 4, which relate to the clutch 90.

Figure 1:
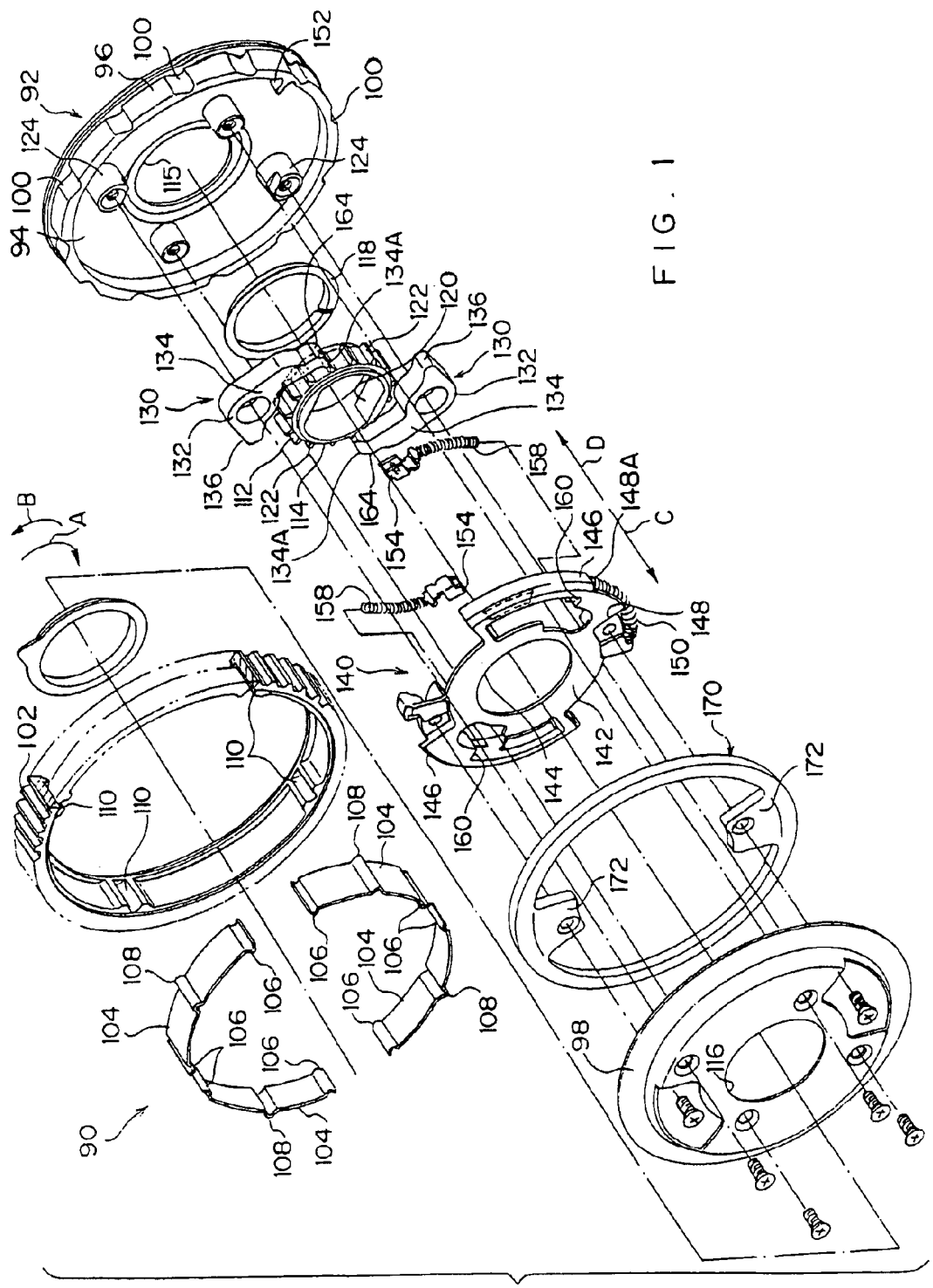
FIG. 1 is an exploded perspective view of a clutch mechanism of a webbing winding device relating to a first embodiment of the present invention.

As shown in FIG. 1, the clutch 90 is provided with a base plate 92, which serves as an intermediate rotating body. At the base plate 92, a substantially ring-shaped peripheral wall 96, which serves as an intermediate peripheral wall, is formed along an outer peripheral portion of a circular disc-form base portion 94. Thus, the base plate 92 is formed in a tubular shape with a bottom (or a shallow-bottomed tray shape), a dimension of this tubular shape in an axial direction thereof being extremely short. At an opening end at one end side in the axial direction of the base plate 92 (the side shown by the direction of an arrow C in FIG. 1), a thin, circular disc-form cover 98 is attached. The cover 98 basically closes off the open end of the base plate 92.

Figure 2:
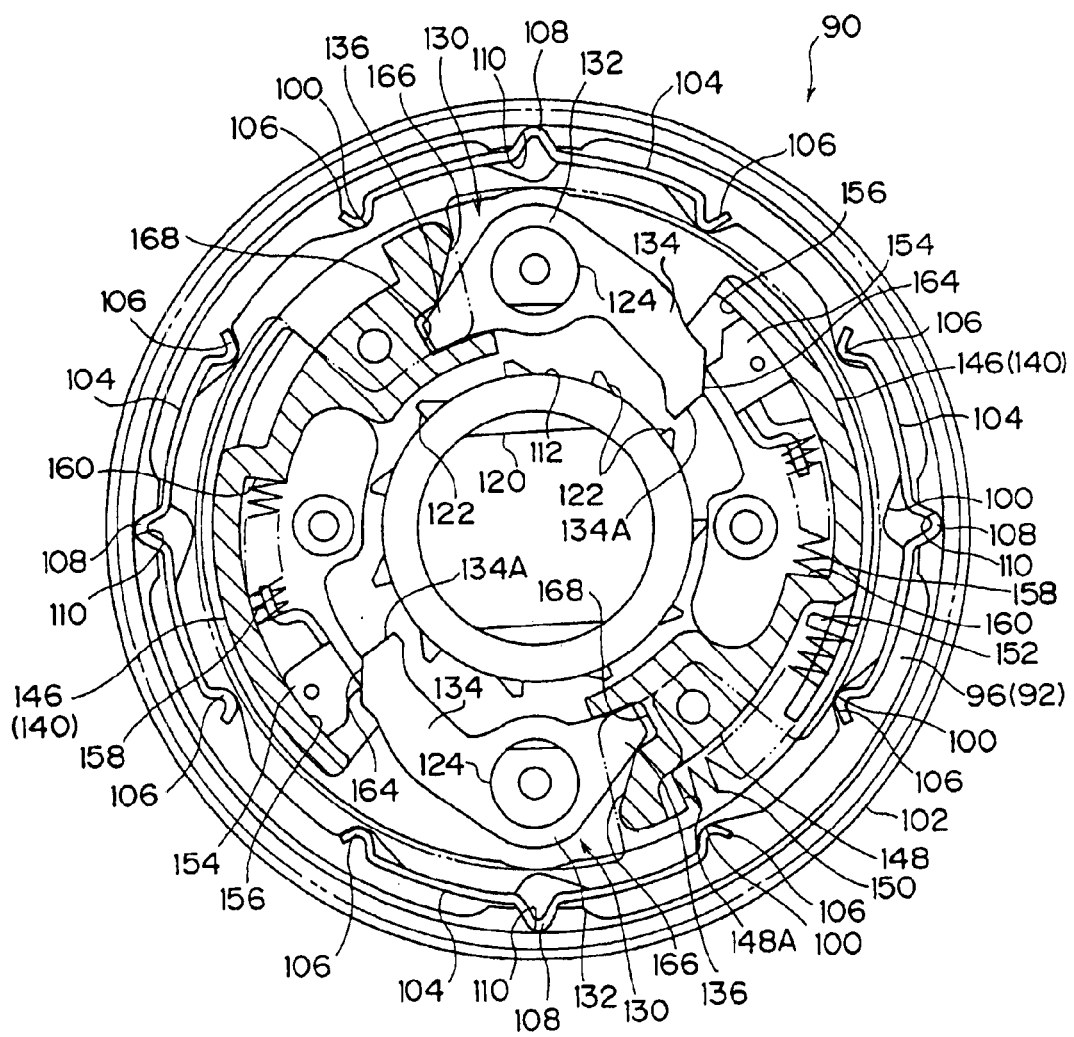
FIG. 2 is a side view showing structure of the clutch mechanism.
Figure 3:
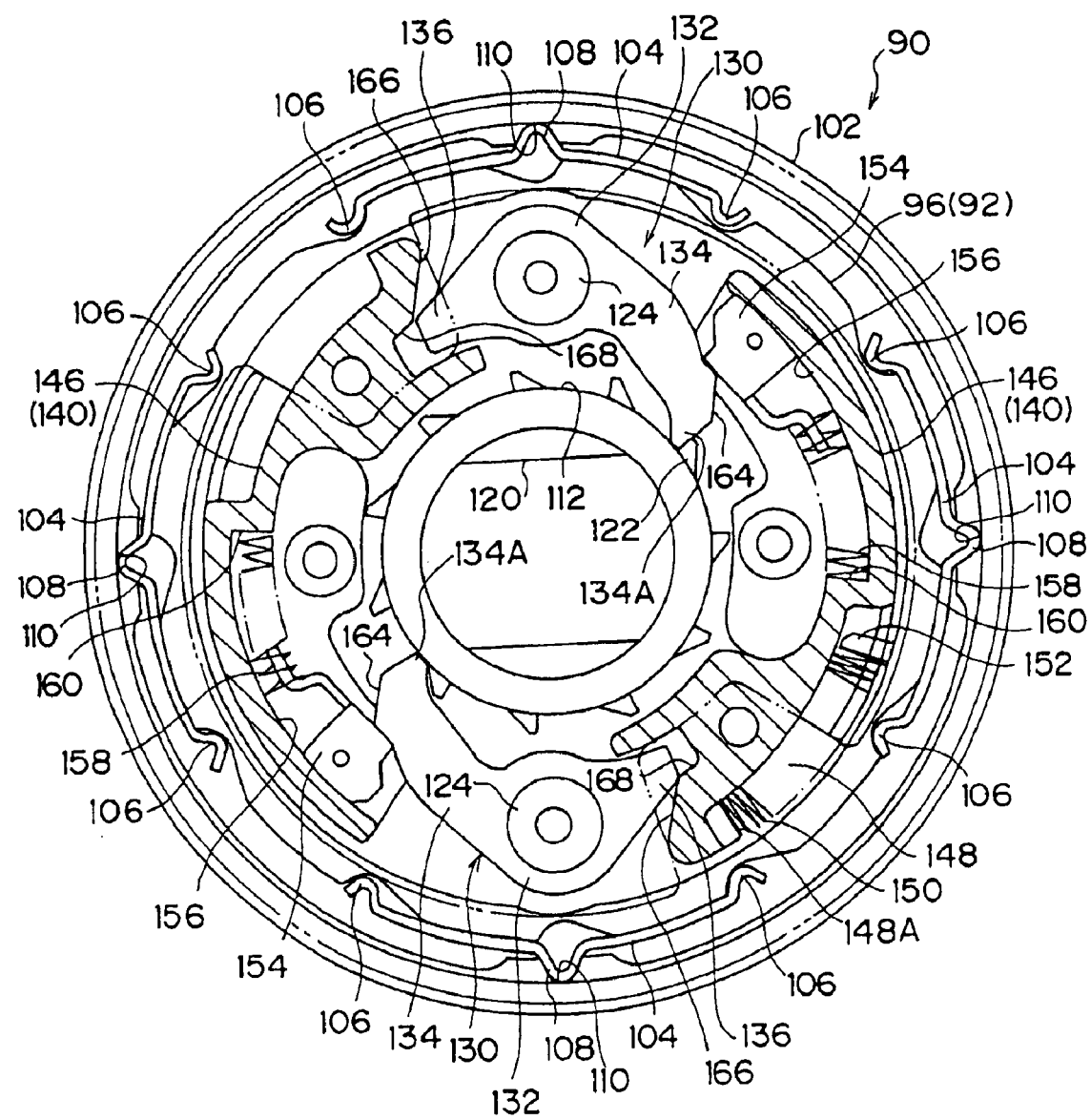
FIG. 3 is a side view corresponding to FIG. 2, showing a state in which coupling means is engaged at a slave shaft.
Figure 4:
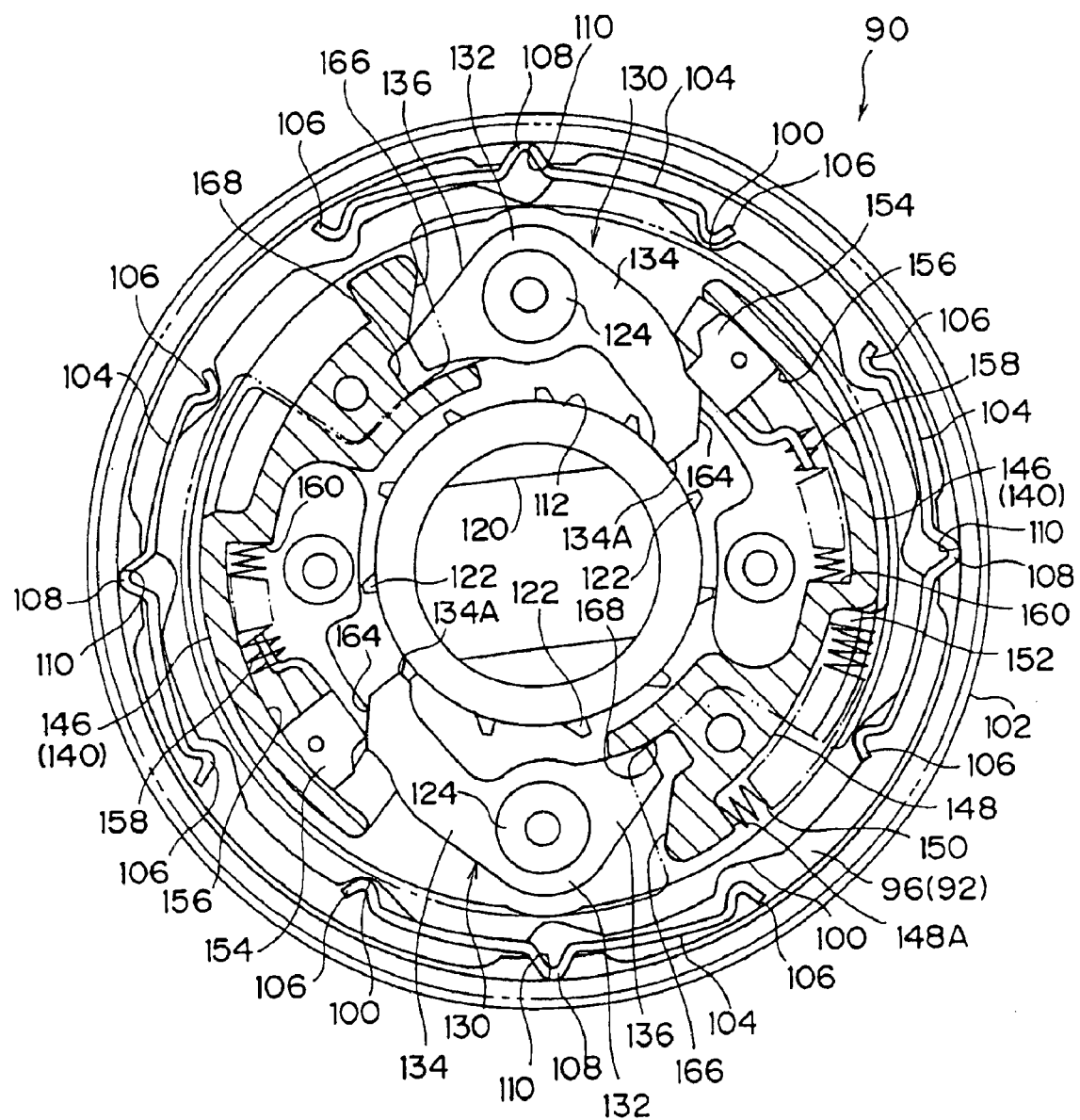
FIG. 4 is a side view corresponding to FIG. 2, showing a state in which one coupling member is lifted up at a tooth peak of an outward tooth of the slave shaft.

Engaging recess portions 100 are formed at an outer peripheral portion of the peripheral wall 96, at a certain spacing along a peripheral direction thereof. An external gear 102, which serves as a motor side rotating body and as an outer side rotating body, is disposed at the outer side of the peripheral wall 96. The external gear 102 is formed substantially in a ring shape, with a significantly greater number of teeth than the gear 62. An internal diametric dimension of the external gear 102 is significantly greater than an external diametric dimension of the peripheral wall 96, and an annular gap is formed between an inner peripheral portion of the external gear 102 and the outer peripheral portion of the peripheral wall 96. As shown in FIGS. 2 to 4, a plurality of torque limiters 104 is disposed, non-continuously in the peripheral direction, in this annular gap.

As shown in FIGS. 1 to 4, the torque limiters 104 are narrow-width plate-form metal pieces having springiness, with width dimensions that are less than an axial direction dimension of the external gear 102. Engaging portions 106, which are capable of entering into the engaging recess portions 100, are formed at both of length direction end portions of each of the torque limiters 104. Engaging protrusions 108, which are inflected so as to protrude substantially in a direction opposite to a direction in which the engaging portions 106 protrude, are formed at length direction substantially central portions of the torque limiters 104.

Engaging recess portions 110 are formed at the inner peripheral portion of the external gear 102 in correspondence with the engaging protrusions 108. In a state in which the engaging protrusions 108 are entered into the engaging recess portions 110, the base plate 92 is substantially integrally coupled with the external gear 102, via the torque limiters 104, by the engaging portions 106 entering into the engaging recess portions 100. Accordingly, if the external gear 102 acts to rotate relative to the base plate 92 about the axial center of the base plate 92, the torque limiters 104 also act to rotate, integrally with the external gear 102.

However, because the engaging portions 106 of the torque limiters 104 are entered into the engaging recess portions 100, when the engaging portions 106 act to rotate along the peripheral direction of the peripheral wall 96, the engaging recess portions 100 interfere with the engaging portions 106, and restrict rotation of the engaging portions 106. Consequently, relative rotation of the external gear 102 with respect to the base plate 92 is restricted. Thus, in this structure, the external gear 102 and the base plate 92 are basically integrally coupled.

However, because the torque limiters 104 are metallic pieces having springiness as described above, if a rotation force generated by relative rotation of the external gear 102 relative to the base plate 92 is large enough to remove the engaging portions 106 from the engaging recess portions 100 against spring force (urging force) of the torque limiters 104, hindrance of the engaging portions 106 by the engaging recess portions 100 is released. Thus, this structure enables relative rotation of the external gear 102 relative to the base plate 92.

Meanwhile, at the inner side of the base plate 92, an adaptor 112 is disposed substantially coaxially with the base plate 92. The adaptor 112 has a substantially tubular shape, and serves as a slave shaft and as an inner side rotating body. An axial direction other end (at a side in the direction of an arrow D in FIG. 1) of the adaptor 112 is wholly rotatably supported at a round hole 115, which is formed at the center of the base portion 94 (of the base plate 92). A circular tube-form tube portion 114, which is formed coaxially at an axial direction one end of the adaptor 112, is rotatably supported at a round hole 116, which is formed in the cover 98.

A spacer 118, which is formed in a ring shape of a synthetic resin material, is disposed between the adaptor 112 and the base portion 94 of the base plate 92. The spacer 118 is supported at a tube portion 114 of the adaptor 112. One axial direction end face of the spacer 118 abuts against the base portion 94, and another axial direction end face of the spacer 118 abuts against an end face of a portion connecting the tube portion 114 with a main body portion of the adaptor 112.

A fitting hole 120 is formed in the adaptor 112. The fitting hole 120 passes through the adaptor 112 along the axial direction thereof. An axial direction other end of the aforementioned spool 20 is fitted in the fitting hole 120, and the adaptor 112 and the spool 20 are coaxially and integrally coupled. A plurality, which is an odd number, of outward teeth 122, are formed with a certain spacing at an outer peripheral portion of the adaptor 112.

At a radial direction outer side of the adaptor 112, a pair of bosses 124 is formed at the base portion 94 of the base plate 92. Each of the bosses 124 is formed in a substantially circular tube shape, and is provided standing toward the axial direction one side from the base portion 94. These bosses 124 are formed so as to face one another across the round hole 115. A pawl 130, which serves as a coupling member, is provided at each of the bosses 124.

Each of the pawls 130 is provided with a main body 132. The main body 132 is formed in a ring shape with an internal diametric dimension very slightly larger than an external diametric dimension of the boss 124. The boss 124 is fitted into the main body 132 such that the boss 124 passes through the main body 132. Thus, the pawl 130 is supported to be rotatable about the boss 124.

A coupling plate 134 is formed at a portion of an outer periphery of the main body 132. The coupling plate 134 is formed so as to extend to a winding direction side of the spool 20 relative to the main body 132 in the state in which the main body 132 is supported at the boss 124. Further, the coupling plate 134 is formed such that, when the coupling plate 134 rotates about the boss 124 through a predetermined angle in the winding direction, an angled portion at a distal end 134A thereof abuts against the outer peripheral portion of the above-described adaptor 112, between one and another of the outward teeth 122 of the adaptor 112.

The distal end 134A of the coupling plate 134 has an inclined surface which is inclined to correspond to drawing direction side faces of the teeth of the adaptor 112. Thus, with this structure, the distal end 134A abuts against and interferes with the outward teeth 122, and rotation of the adaptor 112 in the drawing direction is restricted.

Here, the bosses 124 are formed so as to oppose one another across the round hole 115, as mentioned above. Therefore, in a state in which the respective angled portions of the distal ends 134A of the two pawls 130, which are basically substantially the same shape, are in contact with the outer peripheral surface of the adaptor 112, the distal end 134A of one of the pawls 130 is positioned at an opposite side of the axial center of the adaptor 112 from the distal end 134A of the other pawl 130. Accordingly, with this structure, if the total number of the outward teeth 122 at the outer peripheral portion of the adaptor 112 was an even number and each of the outward teeth 122 would be formed at the opposite side of the axial center of the adaptor 112 from another of the outward teeth 122, and the distal ends 134A of the two pawls 130 could both abut against the outward teeth 122 at the same time.

However, in the present embodiment, the total number of the outward teeth 122 formed at the outer peripheral portion of the adaptor 112 is, as mentioned above, an odd number. Therefore, in a state in which the distal end 134A of one of the pawls 130 abuts against one of the outward teeth 122, the distal end 134A of the other pawl 130 is separated from the outward teeth 122 along the peripheral direction of the adaptor 112 (that is, the distal end 134A of the other coupling plate 134 is not in contact with the outward teeth 122).

A release plate 136 also protrudes from the outer peripheral portion of each main body 132. The release plate 136 is formed approximately at the opposite side of the main body 132 relative to the side thereof at which the coupling plate 134 is formed. An outer side side face of the release plate 136 is a face which is inclined toward a radial direction outer side of the base plate 92 relative to the drawing direction. When the release plate 136 is rotated in the drawing direction, the coupling plate 134 rotates in a direction of separating from the outer peripheral portion of the adaptor 112.

The clutch 90 is further provided with a rotation disc 140, which serves as a coupling compelling member. The rotation disc 140 is provided with a substantially plate-like base portion 142, whose thickness direction is set along the axial direction of the base plate 92 and the adaptor 112. A round hole 144 is formed in the base portion 142. An internal diametric dimension of the round hole 144 is very slightly larger than an external diametric dimension of the tube portion 114, which is formed coaxially with respect to the outer peripheral portion of the adaptor 112 at the axial direction one end side of the adaptor 112. Consequent to assembly such that the tube portion 114 passes through the round hole 144, the base portion 142, and hence the rotation disc 140, is supported at the adaptor 112 to be rotatable about the adaptor 112.

A pair of blocks 146 is formed at the base portion 94 side of the base portion 142, to serve as coupling compelling means. These blocks 146 are formed so as to oppose one another across the round hole 144. One of the aforementioned bosses 124 is disposed in a gap between the pair of blocks 146 at an outer side of the round hole 144. The other boss 124 is disposed in another gap between the pair of blocks 146, at a side of the round hole 144 which is opposite to the side thereof at which the gap mentioned above is formed.

A spring accommodation portion 148 is formed at an outer peripheral portion of one of the pair of blocks 146 (at an outer side face, in a radial direction of the round hole 144, of the blocks 146). A compression coil spring 150, which serves as urging means, is accommodated at the spring accommodation portion 148.

The compression coil spring 150 is accommodated at the spring accommodation portion 148 in a state such that the compression coil spring 150 is curved peripherally about the center of the round hole 144. An end portion of the compression coil spring 150 at the winding direction side thereof abuts against a wall portion 148A of the spring accommodation portion 148. An end portion of the compression coil spring 150 at the drawing direction side thereof abuts against an abutting wall 152. The abutting wall 152 protrudes from an inner peripheral portion of the peripheral wall 96 of the base plate 92 and enters into the spring accommodation portion 148.

Because the rotation disc 140 is rotatably supported at the tube portion 114 of the adaptor 112, in basic terms, the adaptor 112 is also relatively rotatable with respect to the base plate 92. However, as described above, the winding direction side end portion of the compression coil spring 150 abuts against the wall portion 148A of the spring accommodation portion 148 and the drawing direction side end portion of the same abuts against the abutting wall 152 of the base plate 92. Therefore, if the base plate 92 starts to rotate relatively in the winding direction with respect to the rotation disc 140, the abutting wall 152 pushes the rotation disc 140 in the winding direction via the compression coil spring 150, and the rotation disc 140 rotates to follow the rotation of the base plate 92. Therefore, as long as a rotation force large enough to counteract the urging force of the compression coil spring 150 does not act on the rotation disc 140, relative rotation of the base plate 92 in the winding direction relative to the rotation disc 140 is limited.

A pushing piece 154 is provided at an inner peripheral portion of each of the blocks 146. These pushing pieces 154 are disposed at winding direction sides of the pawls 130. Each pushing piece 154 is relatively movable with respect to the block 146 (that is, with respect to the rotation disc 140) along a peripheral wall 156, which is formed at the block 146 so as to curve coaxially with respect to the round hole 144. A compression coil spring 158 is provided at a side of the pushing piece 154 which is opposite to a side thereof at which the pawl 130 is disposed. The compression coil spring 158 is disposed in a state of being inflected along the peripheral wall 156. One end of the compression coil spring 158 is engaged and coupled at an end portion of the pushing piece 154 at a side of the pushing piece 154 which is opposite to the side thereof at which the pawl 130 is disposed. The other end of the compression coil spring 158 abuts against an abutting wall 160, which is formed at the rotation disc 140 at a side of the compression coil spring 158 which is opposite to the side thereof at which the pushing piece 154 is disposed. In this state, a protrusion 162, which is protrudingly formed from the abutting wall 160 toward the pushing piece 154, is engaged and coupled with the compression coil spring 158.

An inclined surface 164 is formed at a width direction outer end of the coupling plate 134 of each pawl 130, to correspond with the pushing piece 154. The inclined surface 164 is inclined toward the radial direction outer side of the base plate 92 with respect to the winding direction. In the state in which the distal end 134A is not in contact with the outer peripheral portion of the adaptor 112, the inclined surface 164 faces the pushing piece 154 along the peripheral direction of the base plate 92 and rotation disc 140. The pushing piece 154 is formed so as to abut against the inclined surface 164 when the base plate 92 relatively rotates in the winding direction by a predetermined amount with respect to the rotation disc 140. From this abutting state, when the base plate 92 starts to relatively rotate further in the winding direction with respect to the rotation disc 140, the pushing piece 154 pushes in the drawing direction against the inclined surface 164, and this pushing force rotates the pawl 130 in the winding direction about the boss 124.

A pushing portion 166 is formed at a winding direction side end portion, along the peripheral direction of the rotation disc 140, of each of the blocks 146, and a release plate accommodation portion 168 is formed at the rotation disc 140 axial center side relative to the pushing portion 166. The pushing portion 166 is formed to correspond, along the peripheral direction of the rotation disc 140, with the release plate 136 of the pawl 130. From a portion of the release plate 136 that joins with the main body 132 (a proximal end portion of the release plate 136) toward a distal end side of the release plate 136, the release plate 136 is gradually inflected toward the base plate 92 axial center side thereof. A width direction outer side face of the release plate 136 is inflected in a similar manner.

Accordingly, if the base plate 92 relatively rotates by a predetermined amount in the drawing direction relative to the rotation disc 140, the pushing portion 166 abuts against the width direction outer side face of the release plate 136. From this state, if the base plate 92 relatively rotates further in the drawing direction with respect to the rotation disc 140, the pushing portion 166 pushes in the winding direction against the distal end portion of the release plate 136. Here, the distal end of the release plate 136 is set to be an inclined surface which is angled outward in the radial direction of the rotation disc 140 relative to the drawing direction. Thus, when the pushing portions 166 press the distal ends of the release plates 136, the pawls 130 are rotated about the bosses 124 in the drawing direction, and are guided to the release plate accommodation portions 168.

The friction ring 170 is coaxially disposed between the base portion 142 of the rotation disc 140 and the cover 98. The friction ring 170 is formed overall in a ring form. A pair of attachment pieces 172, which have the form of tongue pieces from an inner peripheral portion of the friction ring 170, protrude so as to oppose one another across the center of the friction ring 170. The attachment pieces 172 are integrally coupled to the base portion 142 of the rotation disc 140 by fastening means such as screws or the like. As a result, the rotation disc 140 and the friction ring 170 are made integral. An outer peripheral portion of the friction ring 170 corresponds to a distal end of the braking plate 80 described earlier. When the frame 64 rotates about the shaft 70 in the drawing direction, a distal end of the braking plate 80 slides against the outer peripheral portion of the friction ring 170.

At the clutch 350 with the structure described above, the external gear 102 meshes with the gear 62.

Operations and Effects of the Present Embodiment

Next, operations and effects of the present embodiment will be described through a description of operations of the 10.

Basic Operations of the Webbing Winding Device 10

First, basic operations of the webbing winding device 10 will be described.

At this webbing winding device 10, from an accommodated state in which the webbing belt 28 is wound on the spool 20 in the layered form, when an unillustrated tongue plate is pulled and the webbing belt 28 is pulled, the webbing belt 28 is drawn out while the spool 20 is rotated in the drawing direction, against the urging force of the spiral spring 34 which urges the spool 20 in the winding direction. Hence, in a state in which the webbing belt 28 has been drawn out, the webbing belt 28 is wrapped round the front of the body of the occupant sitting at the seat, and the tongue plate is inserted at an unillustrated buckle device. While the tongue plate is retained at the buckle device, the webbing belt 28 is in a state of application to the body of the occupant (herebelow, simply referred to as "the applied state").

When the webbing belt 28 is drawn out and the spool 20 is rotated in the drawing direction in order to apply the webbing belt 28, the spiral spring 34 is wound up and the urging force of the spiral spring 34 urging the spool 20 to the winding direction side increases. Hence, in the applied state, the urging force of the spiral spring 34 acts so as to wind the webbing belt 28 on the spool 20. Thus, in essence, the webbing belt 28 is closely fitted to the body of the occupant by this urging force, and the webbing belt 28 restrains and holds the body of the occupant with a force corresponding to the urging force at this time.

When the retention of the tongue plate by the buckle device is released and the tongue plate is removed from the buckle device, a force opposing the urging force of the spiral spring 34 to keep the webbing belt 28 in the drawn-out state is released. Consequently, the spool 20 is rotated in the winding direction by the urging force of the spiral spring 34. By this rotation of the spool 20 in the winding direction, the webbing belt 28 that had been drawn out is wound on at the outer peripheral portion of the spool 20 in the layered form, and thus the webbing belt 28 is accommodated.

Now, because the spool 20 is fitted to the adaptor 112 of the clutch 90, when the spool rotates to draw out or wind up the webbing belt 28, the adaptor 112 rotates. However, in this state, the adaptor 112 rotates alone. Because the base plate 92, the rotation disc 140 and the like do not rotate, the pawls 130 do not rotate, and hence the external gear 102 does not rotate. Thus, the rotation of the spool 20 is not transmitted to the output shaft 50 of the motor 44 by the external gear 102, the gear 62 and the gear 56.

Operation of the Webbing Winding Device 10 at a Time of Approaching a Frontward Obstacle During running of the vehicle, the forward surveillance sensor 54 detects a distance frontward of the vehicle to an obstacle. An electronic signal which includes a signal level corresponding to the distance to the obstacle is outputted from the forward surveillance sensor 54. The electronic signal outputted from the forward surveillance sensor 54 is inputted to the ECU 52. At the ECU 52, it is judged, based on the electronic signal from the forward surveillance sensor 54, whether or not the distance to the obstacle is less than a predetermined value.

Then, if the ECU 52 has judged that the distance to the obstacle is less than the predetermined value, the ECU 52 outputs a control signal to the driver 46, and electric current flows to the motor 44 via the driver 46. Thus, the motor 44 is driven to forward-rotate at a speed of at least a predetermined value, and the output shaft 50 is forward-rotated.

The rotation of the output shaft 50 is transmitted to the external gear 102 of the clutch 90 via the gears 56 and 62 while being reduced in speed. Thus, the external gear 102 rotates in the winding direction at a rotation speed of at least a predetermined value. Because the external gear 102 is mechanically coupled to the base plate 92 via the torque limiters 104, when the external gear 102 rotates in the winding direction, the base plate 92 rotates in the winding direction integrally therewith.

When the base plate 92 rotates in the winding direction, the abutting wall 152 pushes the drawing direction side end portion of the compression coil spring 150, and the compression coil spring 150 pushes the wall portion 148A of the spring accommodation portion 148 by the urging force thereof. Hence, the rotation disc 140 rotates to follow the base plate 92.

Meanwhile, when the rotation of the output shaft 50 is transmitted to the gear 62 via the gear 56 as described above, the rotation is transmitted from the gear 62 to the gear 72, and the gear 72 rotates downward about the gear 62 while rotating about the shaft 74. Because the urging force of the tension coil spring 78 acts on the frame 64, which supports the shaft 74 supporting the gear 72, the gear 72 basically cannot rotate downward about the gear 62. However, when the output shaft 50 rotates at the rotation speed at or above the predetermined value as mentioned above and this rotation is transmitted to the gear 72, a combined force, of the gravitational force according to the weight of the gear 72 itself and the weight of the weight 76 and the rotation force of the gear 72 about the gear 62, overcomes the urging force of the tension coil spring 78. Thus, the gear 72, and hence the frame 64, is rotated about the shaft 70.

Consequently, the braking plate 80 slides against the outer peripheral portion of the friction ring 170, and friction is generated between the braking plate 80 and the outer peripheral portion of the friction ring 170. Thus, rotation of the friction ring 170, and hence the rotation disc 140 which is integral with the friction ring 170, is restrained. As a result, relative rotation between the base plate 92 and the rotation disc 140 occurs, and the base plate 92 rotates in the winding direction relative to the rotation disc 140.

When the base plate 92 relatively rotates by at least a predetermined amount in the winding direction relative to the rotation disc 140 in this manner, the pushing pieces 154 formed at the blocks 146 of the rotation disc 140 abut against the coupling plates 134 of the pawls 130. When, in this state, the base plate 92 acts to relatively rotate further in the winding direction with respect to the rotation disc 140, the pushing pieces 154 push in the drawing direction against the inclined surfaces 164 of the coupling plates 134. The pushing forces applied to the inclined surfaces 164 act both in the drawing direction and inward in the radial direction of the rotation disc 140 and the base plate 92. The components that act inward in the radial direction cause the pawls 130 to rotate in the winding direction about the bosses 124. When the pawls 130 rotate about the bosses 124 in the winding direction, the angled portions of the distal ends 134A are abutted against the outer peripheral portion of the adaptor 112, as shown in FIG. 3. In this state, the pawls 130 rotate in the winding direction about the center of the base plate 92, together with the base plate 92, until the angled portion of one of the distal ends 134A abuts against the nearest of the outward teeth 122 at the winding direction side of the distal end 134A.

Subsequently, from this state, when the distal end 134A abuts against this outward tooth 122 and the base plate 92 rotates further in the winding direction, the distal end 134A of the pawl 130 pushes the outward tooth 122 in the winding direction. Thus, the adaptor 112, and hence the spool 20, is rotated in the winding direction. The webbing belt 28 is wound on at the spool 20 by this rotation of the spool 20. As a result, looseness of the webbing belt 28, known as "slack", is eliminated and a restraining force from the webbing belt 28 on the occupant's body is raised. Temporarily thereafter, even if the occupant carries out an operation of rapid control of the vehicle (emergency braking) and the vehicle enters a rapid deceleration state, the webbing belt 28 assuredly holds the body of the occupant.

When the motor 44 stops in this state, in which the slack has been eliminated thus, rotation of the base plate 92 in the winding direction stops. When the rotation of the base plate 92 stops, the compression coil spring 150 pushes the rotation disc 140 in the winding direction by the urging force thereof, and the rotation disc 140 rotates in the winding direction. When the rotation disc 140 rotates thus, the pushing portions 166 abut against the release plates 136 of the pawls 130 and push in the winding direction against the release plates 136. Because the release plates 136 are subjected to these pushing forces, the pawls 130 rotate in the drawing direction about the bosses 124, and the distal ends 134A of the coupling plates 134 are separated from the outer peripheral portion of the adaptor 112, as shown in FIG. 2. As a result, the mechanical coupling of the base plate 92 with the adaptor 112, which is to say the mechanical coupling of the output shaft 50 of the motor 44 with the compression coil spring 150 is released.

Now, in the present embodiment as described above, the total number of the outward teeth 122 of the adaptor 112 is set to an odd number. Thus, in the state in which the distal end 134A of one of the pawls 130 abuts against the outward teeth 122, the distal end 134A of the other pawl 130 is separated from the outward teeth 122 along the peripheral direction of the adaptor 112. Thus, the distal end 134A of the other pawl 130 is located at an intermediate portion, along the peripheral direction of the adaptor 112, between the nearest thereto of the outward teeth 122 in the winding direction and the nearest thereto of the outward teeth 122 in the drawing direction.

In other words, in the present embodiment, in the state in which the distal ends 134A of the two pawls 130 abut against the outer peripheral portion of the adaptor 112, a spacing between the distal end 134A of one pawl 130 and the distal end 134A of the other pawl 130 is not an integer multiple of a pitch of the outward teeth 122. Therefore, at the time at which both of the pawls 130 are temporarily rotating about the bosses 124, if the distal end 134A of one of the pawls 130 abuts against a tooth peak of the outward teeth 122, the distal end 134A of the other pawl 130 will not abut against a tooth peak of the outward teeth 122, but will abut against the outer peripheral portion of the adaptor 112, between neighboring outward teeth 122 in the peripheral direction.

Thus, even though the distal end 134A of the one pawl 130 is abutted against a tooth peak of the outward teeth 122 and cannot mesh with the outward teeth 122, the distal end 134A of the other pawl 130 will assuredly mesh with the outward teeth 122 when the base plate 92 has rotated by an amount corresponding to substantially half of the pitch of the outward teeth 122. Thus, the rotation of the base plate 92 can be quickly and assuredly transmitted to the adaptor 112, and the rotation force of the motor 44 can be transmitted to the spool 20.

In the state in which the distal end 134A of the one pawl 130 abuts against the tooth peak of the outward teeth 122, the coupling plate 134 abuts against the pushing piece 154 and stays in this state. Now, if the pushing piece 154 was integral with the rotation disc 140, relative rotation of the base plate 92 further in the winding state with respect to the rotation disc 140 would be restricted. In this state, the distal end 134A of the other pawl 130 would not sufficiently interfere with the other pushing piece 154, and the pushing piece 154 could not sufficiently rotate the other pawl 130 in the winding direction. Thus, the distal end 134A of the other pawl 130 might not be able to abut against the outward teeth 122.

However, in the present embodiment, the one coupling plate 134 abuts against the pushing piece 154 while the distal end 134A of the one pawl 130 stays abutted against the tooth peak of the outward teeth 122. In this state, when the base plate 92 acts to relatively rotate further in the winding direction with respect to the rotation disc 140, the distal end 134A of the pawl 130 pushes the pushing piece 154, against the urging force of the compression coil spring 158, and displaces the pushing piece 154 in the winding direction, as shown in FIG. 4. Accordingly, the base plate 92 rotates relatively in the winding direction with respect to the rotation disc 140.

Accordingly, the pushing piece 154 corresponding to the other pawl 130 interferes with the distal end 134A of the other pawl 130 and rotates the distal end 134A in the winding direction. Consequently, even if the distal end 134A of the one pawl 130 stays abutted against the tooth peak of the outward teeth 122 while the one coupling plate 134 abuts against the pushing piece 154, the other pawl 130 can be meshed with the outward teeth 122 of the adaptor 112. Thus, the other pawl 130 can assuredly transmit the rotation of the base plate 92 to the adaptor 112.

When the rotating force of the motor 44 rotates the spool 20 in the winding direction as described above, the restraining force on the occupant's body from the webbing belt 28 is increased. However, in the state in which the spool 20 has wound up the webbing belt 28 until the slack is eliminated, the body of the occupant becomes a hindrance to the webbing belt 28 and, in basic terms, the spool 20 cannot wind the webbing belt 28 up further. From this state, if the spool 20 starts to rotate further in the winding direction for winding up the webbing belt 28, the webbing belt 28 will constrict the body of the occupant with a greater force than necessary, which is not preferable.

Here, when the spool 20 starts to wind up the webbing belt 28 more than is required as described above, the body of the occupant becomes a hindrance to winding of the webbing belt 28, and a tension force is applied to the webbing belt 28 from the body of the occupant with a magnitude that corresponds to the winding force of the spool 20 winding up the webbing belt 28. This tension force acts in a direction opposite to the direction in which the spool 20 winds the webbing belt 28. Therefore, when such tension force is applied to the webbing belt 28, the spool 20 stops.

In this state, the rotation force of the motor 44 is being applied to the spool 20 via the external gear 102, the base plate 92, the pawl 130 and the adaptor 112. Thus, in the state in which the spool 20 has stopped, the outward teeth 122 of the adaptor 112 limit rotation of the pawl 130 about the center of the base plate 92, and the pawl 130 limits rotation of the base plate 92 in the winding direction. Further, the base plate 92, via the torque limiters 104, limits rotation of the external gear 102 in the winding direction.

In the state in which the rotation of the external gear 102 is limited thus by the base plate 92 via the torque limiters 104, if the external gear 102 starts to rotate further in the winding direction, the rotation force at this time overcomes the spring force of the torque limiters 104, and the engaging portions 106 of the torque limiters 104 are disengaged from the engaging recess portions 100. As a result, the coupling of the base plate 92 with the external gear 102 is temporarily released, and the external gear 102 rotates in the winding direction until the engaging portions 106 enter into others of the engaging recess portions 100, which are adjacent to the engaging recess portions 100 mentioned above. Thus, when the coupling of the base plate 92 and the external gear 102 is released, transmission of the rotation force of the external gear 102 to the base plate 92, which is to say transmission of the rotation force of the motor 44 to the spool 20, is blocked. Therefore, an increase in the restraining force from the webbing belt 28 can be suppressed.

As described hereabove, the clutch 90 utilized in the webbing winding device 10 not only functions to transmit rotation force but can, in a case in which excessive rotation force operates, block the transmission of the rotation force by the torque limiters 104. Even though the effect described above is provided, the width dimension (the dimension along the axial direction of the external gear 102) of the torque limiters 104 is less than the axial direction dimension of the external gear 102, and the rotation disc 140, the torque limiters 104 and the like are disposed completely, along the radial direction of the external gear 102, between the external gear 102 and the peripheral wall 96 of the base plate 92.

Furthermore, members such as the pawls 130, the rotation disc 140 and the like are disposed between the peripheral wall 96 and the adaptor 112 along the radial direction of the peripheral wall 96, and these members are accommodated at the inner side of the external gear 102. Therefore, a thickness dimension (axial direction dimension) of the clutch 90 is, for practical purposes, the axial direction dimension of the external gear 102, and this is extremely thin.

Accordingly, the clutch 90 provided with the torque limiters 104 can be made thinner, and the webbing winding device 10 can be made smaller.

Structure of Second Embodiment

Now, other embodiments of the present invention will be described. Note that in each description of an embodiment hereafter, portions that are essentially the same as in embodiment(s) prior to the embodiment being described, including the first embodiment, are given the same reference numbers, and descriptions thereof are omitted.

FIG. 8 shows structure of a webbing winding device 210, which employs a clutch mechanism relating to a second embodiment of the present invention, in elevational view.

As shown in this drawing, the webbing winding device 210 is provided with a clutch 220, which serves as the clutch mechanism, instead of the braking mechanism 60, the clutch 90 and the like. Below, the clutch 220 is described.

Structure of the Clutch 220

Figure 9:
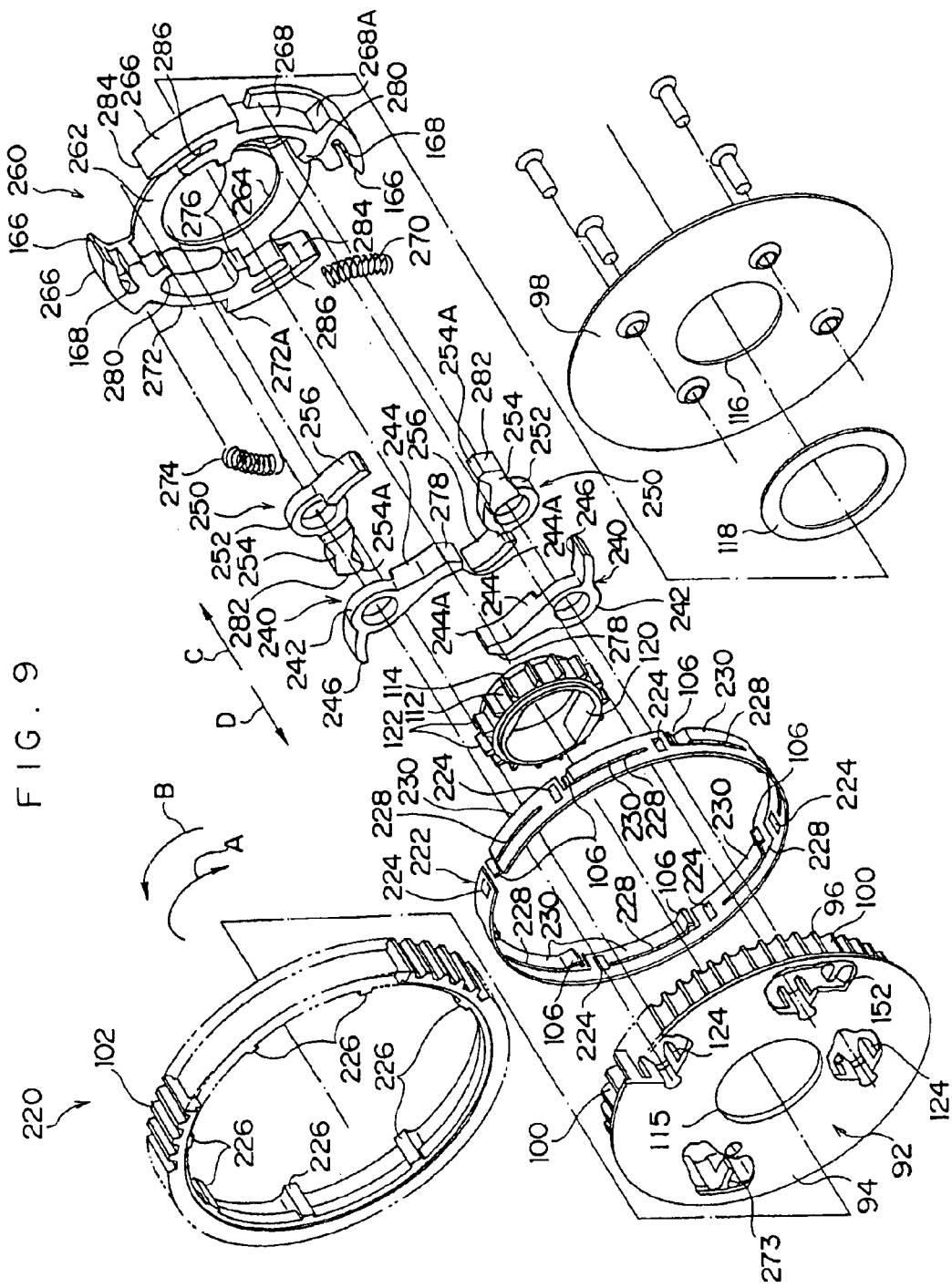
FIG. 9 is an exploded perspective view of a clutch mechanism of the webbing winding device relating to the second embodiment of the present invention.

FIG. 9 shows an exploded perspective view of the clutch 220 employed at the webbing winding device 210. As shown in this drawing, the clutch 220 is equipped with a torque limiter 222. The torque limiter 222 is the same as the torque limiters 104 in respect of being disposed in the annular gap formed between the inner peripheral portion of the external gear 102 and the outer peripheral portion of the peripheral wall 96. However, the torque limiter 222 is different from the torque limiters 104 in being formed substantially in a ring shape as a whole, of a metal or the like having springiness. An axial direction dimension of this ring shape is less than the axial direction dimension of the external gear 102.

A thickness direction of the torque limiter 222 is along a radial direction thereof. Engaging holes 224, which pass through the torque limiter 222 in this thickness direction, are formed at a predetermined spacing along the torque limiter 222 (in the present embodiment, at intervals of approximately 45° about the center of the torque limiter 222).

Figure 10:
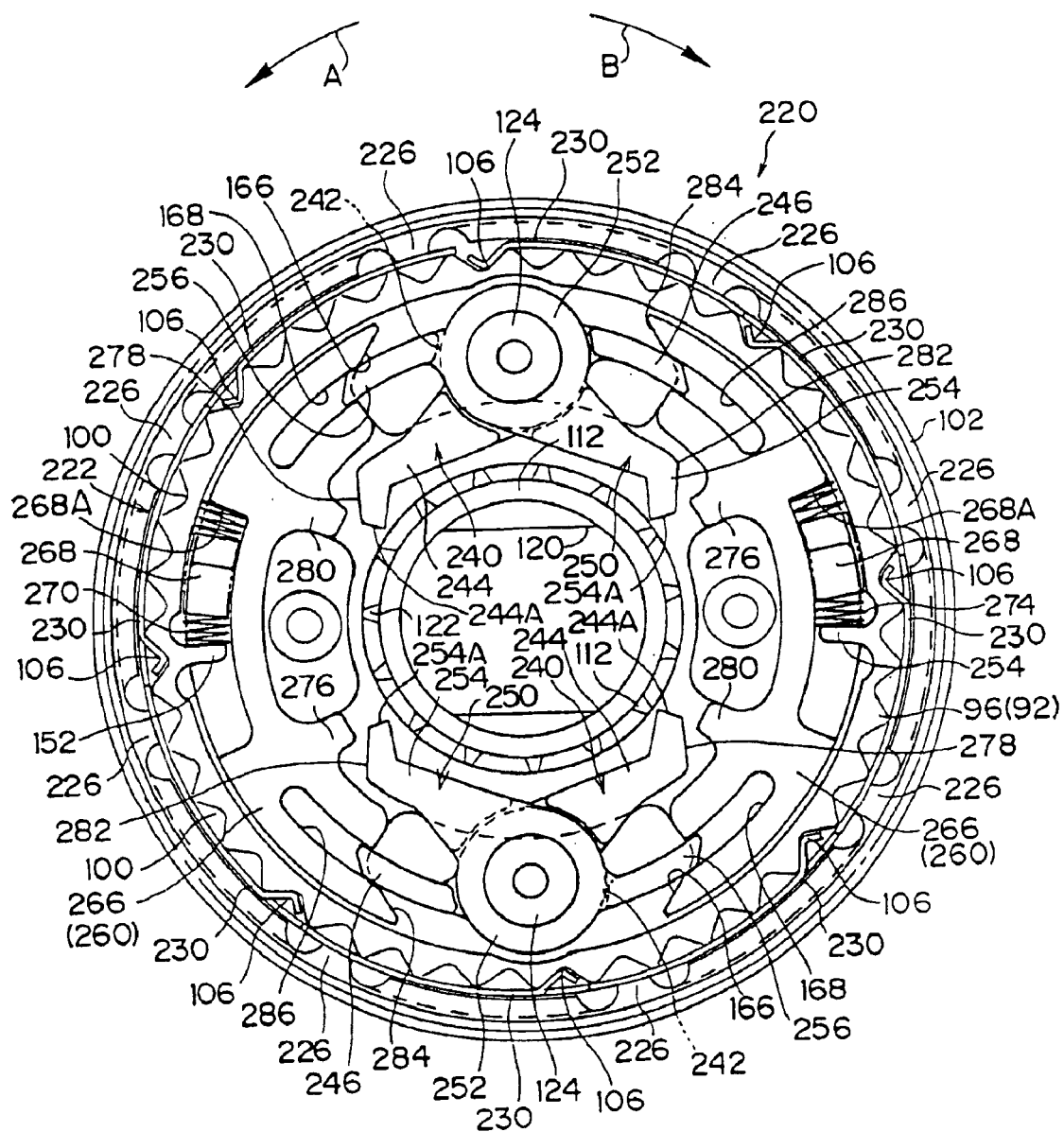
FIG. 10 is a side view showing structure of the clutch mechanism.
Figure 11:
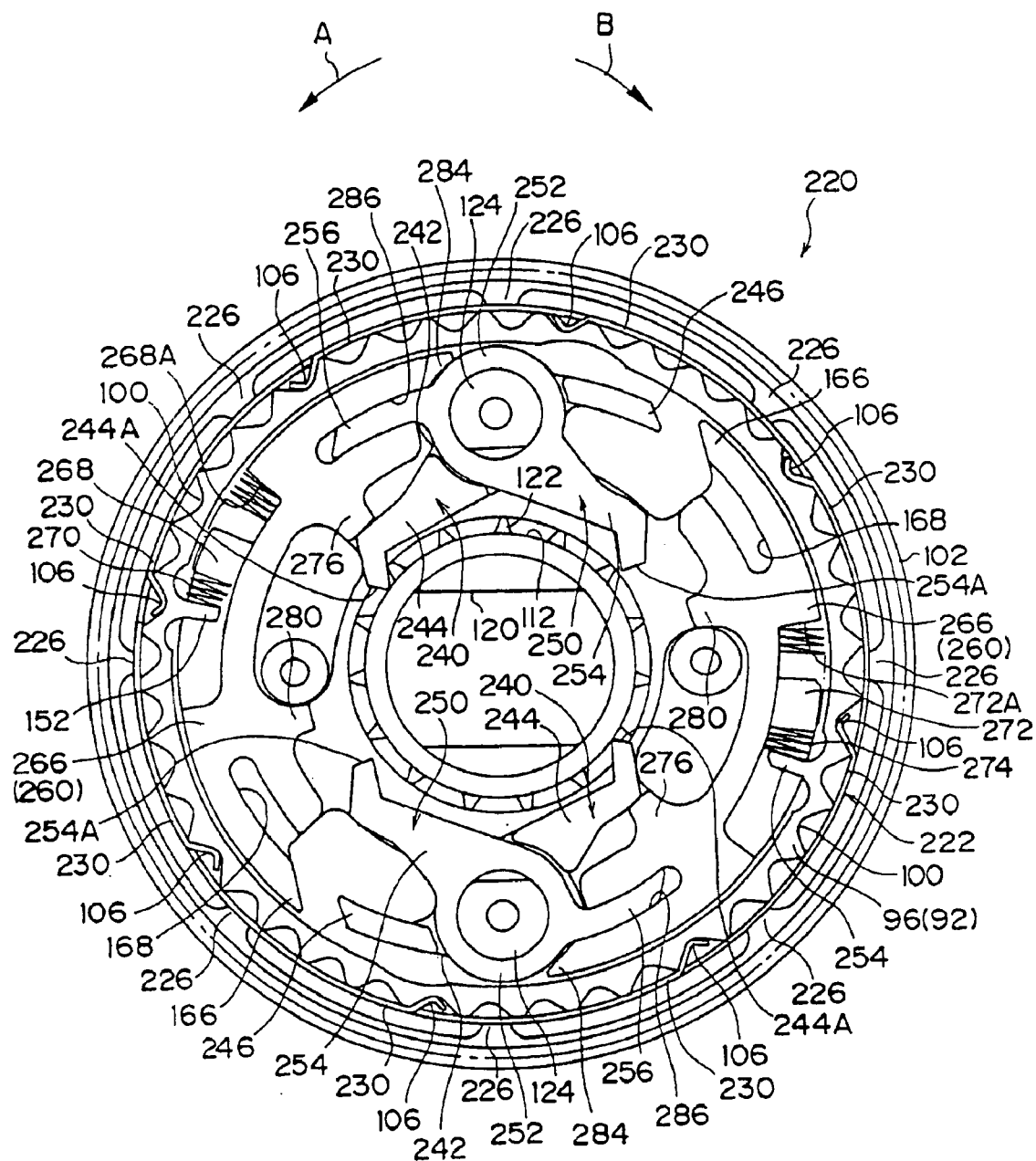
FIG. 11 is a side view corresponding to FIG. 10, showing a state in which rotation in a winding direction is transmitted.
Figure 12:
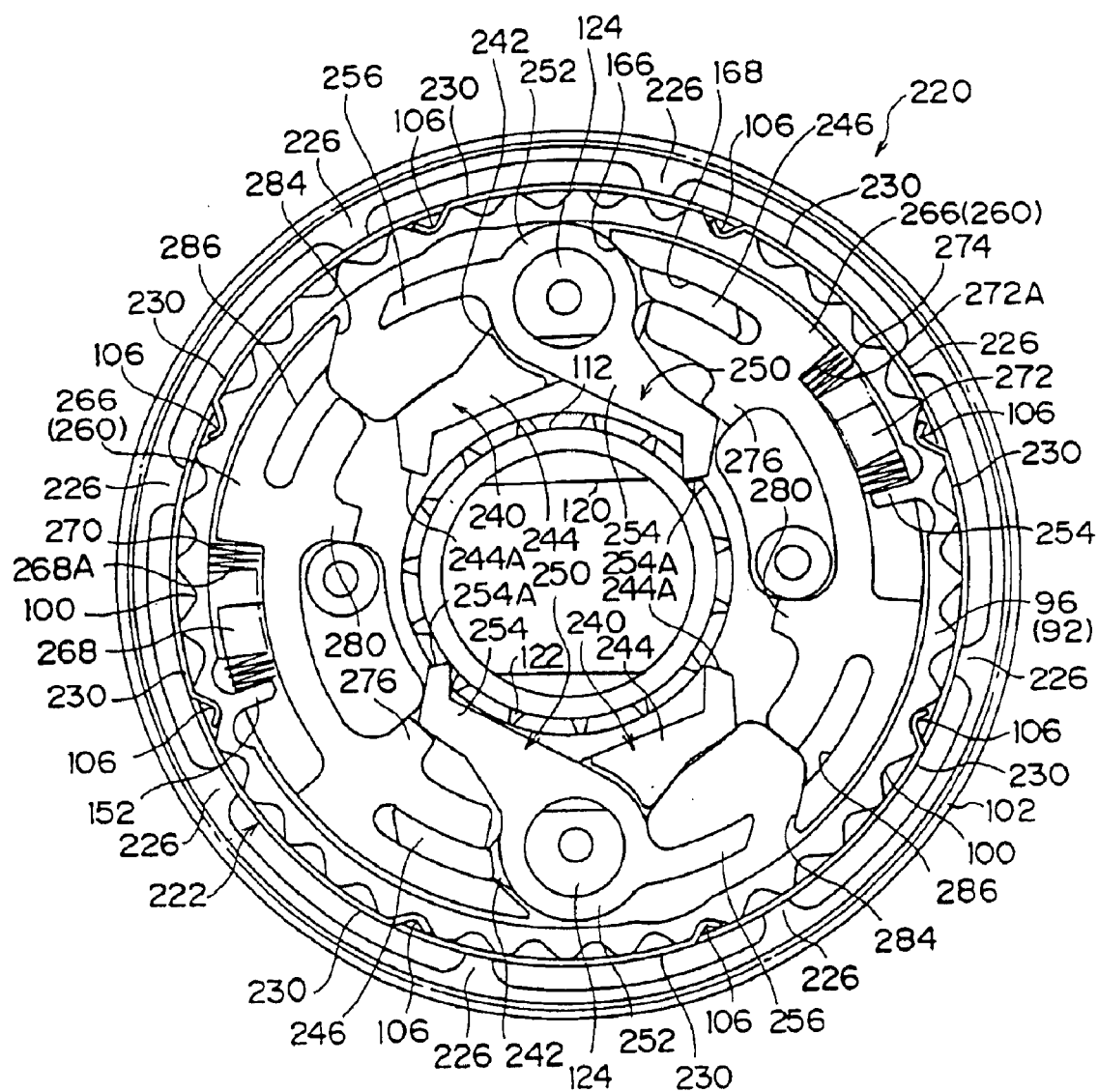
FIG. 12 is a side view corresponding to FIG. 10, showing a state in which rotation in a drawing direction is transmitted.

As shown in FIGS. 10 to 12, engaging protrusions 226, which are formed at a certain spacing at the inner peripheral portion of the external gear 102, enter into the engaging holes 224. Thus, when the external gear 102 acts to rotate relative to the torque limiter 222, inner periphery portions of the engaging holes 224 interfere with the engaging protrusions 226, and relative rotation of the external gear 102 with respect to the torque limiter 222 is limited. (That is, in essence, the torque limiter 222 and the external gear 102 are coupled to be substantially integral.)

As shown in FIG. 9, a plurality of incisions 228 are formed in the torque limiter 222 at a certain spacing along the peripheral direction of the torque limiter 222. One ends of these incisions 228 are positioned substantially at an axial direction midpoint (substantially at a breadth direction midpoint) of the torque limiter 222, and a length direction of the incisions 228 runs along the peripheral direction of the torque limiter 222. At the other end sides in the length direction of the incisions 228, the incisions 228 are inflected substantially through a right angle, and the other ends are formed such that long directions thereof run along the axial direction of the torque limiter 222. Hence, the other ends of the incisions 228 open out at one axial direction end (one breadth direction end) of the torque limiter 222.

As a result of the incisions 228 being formed as described above, at one end side relative to an axial direction central portion of the torque limiter 222, spring plates 230 are formed plurally around the center of the torque limiter 222. Proximal end portions of the spring plates 230 at sides of the one ends of the incisions 228 are continuous with a main body portion of the torque limiter 222, and distal end sides of the spring plates 230 are free ends. The engaging portions 106 are formed at the distal ends of the spring plates 230. The engaging portions 106 are inflectedly formed so as to protrude toward a radial direction center side of the torque limiter 222. The engaging portions 106 correspond with the plurality of engaging recess portions 100 formed at the aforementioned peripheral wall 96 (of the base plate 92). In a state in which the peripheral wall 96 is positioned substantially coaxially at the inner side of the external gear 102, the engaging portions 106 enter into any of the plurality of engaging recess portions 100, as shown in FIGS. 10 to 12.

Because the engaging protrusions 226 enter into the engaging holes 224 as described above, when the external gear 102 acts to rotate relatively with respect to the base plate 92, about the axial center of the base plate 92, the torque limiter 222 naturally acts to rotate integrally with the external gear 102. Further, because the engaging portions 106 of the spring plates 230 enter into the engaging recess portions 100, when the engaging portions 106 act to rotate along the peripheral direction of the peripheral wall 96, the engaging recess portions 100 interfere with the engaging portions 106, and restrict rotation of the engaging portions 106. Consequently, relative rotation of the external gear 102 with respect to the base plate 92 is restricted. Thus, in this structure, the external gear 102 and the base plate 92 are basically integrally coupled.

Further, as described above, because the torque limiter 222 is formed by the metal or the like having springiness, the spring plates 230 naturally have resilience. Therefore, if a rotating force generated by relative rotation of the external gear 102 with respect to the base plate 92 is large enough to counteract spring force (urging force) of the spring plates 230 and disengage the engaging portions 106 from the engaging recess portions 100, hindrance of the engaging portions 106 by the engaging recess portions 100 is released. Thus, this structure enables relative rotation of the external gear 102 with respect to the base plate 92.

As shown in FIGS. 9 to 12, a pawl 240, which serves as the coupling member, is provided at each of the bosses 124 of the clutch 220. Each of the pawls 240 is provided with a main body 242. The main body 242 is formed in a ring shape with an internal diametric dimension very slightly larger than the external diametric dimension of the boss 124. The boss 124 is fitted into the main body 242 such that the boss 124 passes through the main body 242. Thus, the pawl 240 is supported to be rotatable about the boss 124. A coupling plate 244 is formed at a portion of an outer periphery of the main body 242.

A dimension of the coupling plate 244 along the axial direction of the main body 242 is significantly larger than the same dimension of the main body 242. At a face of the coupling plate 244 at a side thereof facing the base portion 94, the coupling plate 244 and the main body 242 are substantially coplanar. At a side of the coupling plate 244 which is opposite to the side thereof facing the base portion 94, the coupling plate 244 protrudes further than the main body 242 toward the axial direction other side of the base plate 92. Thus, because the coupling plate 244 has a longer dimension than the main body 242 along the axial direction of the main body 242, the coupling plate 244 substantially has a tongue plate form with a length direction along the direction of protrusion thereof, and a width direction along the axial direction of the main body 242.

The coupling plate 244 is formed so as to extend to a winding direction side of the spool 20 relative to the main body 242 in the state in which the main body 242 is supported at the boss 124. Further, the coupling plate 244 is formed such that, if the coupling plate 244 rotates about the boss 124 through a predetermined angle in the winding direction, an angled portion at a distal end 244A of the coupling plate 244 abuts against the outer peripheral portion of the above-described adaptor 112, between one and another of the outward teeth 122 of the adaptor 112. The distal end 244A of the coupling plate 244 has an inclined surface which is inclined to correspond to drawing direction side surfaces of the teeth of the adaptor 112. Thus, with this structure, the distal end 244A abuts against and obstructs the outward teeth 122, and rotation of the adaptor 112 in the drawing direction is restricted.

As described earlier, the bosses 124 are formed so as to oppose one another across the round hole 30. Therefore, in a state in which the respective angled portions of the distal ends 244A of the two pawls 240, which are essentially substantially the same shape, are in contact with the outer peripheral surface of the adaptor 112, the distal end 244A of one of the pawls 240 is positioned at an opposite side of the axial center of the adaptor 112 from the distal end 244A of the other pawl 240. Accordingly, with this structure, if the total number of the outward teeth 122 at the outer peripheral portion of the adaptor 112 was an even number, each of the outward teeth 122 would be formed at the opposite side of the axial center of the adaptor 112 from another of the outward teeth 122, and the distal ends 244A of the two pawls 240 could both abut against the outward teeth 122 at the same time.

However, in the present embodiment, as described above, the total number of the outward teeth 122 formed at the outer peripheral portion of the adaptor 112 is an odd number. Therefore, in the state in which the distal end 244A of one of the pawls 240 abuts against one of the outward teeth 122, the distal end 244A of the other pawl 240 is separated from the outward teeth 122 along the peripheral direction of the adaptor 112 (that is, the distal end 244A of the other coupling plate 244 is not in contact with the outward teeth 122).

A release plate 246 also protrudes from the outer peripheral portion of each main body 242. The release plate 246 is formed approximately at the opposite side of the main body 242 from the side thereof at which the coupling plate 244 is formed. Toward a distal end side of the release plate 246, the release plate 246 gradually curves toward a side of the axial center of the base plate 92. When the release plate 246 is rotated in the drawing direction, the coupling plate 244 rotates in a direction of separating from the outer peripheral portion of the adaptor 112. Similarly to the coupling plate 244: a dimension of the release plate 246 along the axial direction of the main body 242 is slightly greater than that of the main body 242; the main body 242 and the release plate 246 are coplanar at the base portion 94 side thereof; and the release plate 246 protrudes further than the main body 242 to the side opposite the side thereof at which the base portion 94 is disposed.

Meanwhile, at a distal end side of each boss 124, beyond the main body 242 of the pawl 240, a main body 252 of a pawl 250, which serves as the coupling member, is supported to be rotatable about the boss 124. The pawls 250 respectively have essentially the same structure as the pawls 240, and have structures in which a coupling plate 254 and a release plate 256, whose dimensions along the axial direction of the main body 252 are larger than the same dimension of the main body 252, protrude from an outer peripheral portion of the main body 252. However, differently from the pawls 240, the coupling plate 254 of each pawl 250 is formed at the drawing direction side relative to the main body 252 in the state in which the main body 252 is supported at the boss 124, and the release plate 256 is formed at the winding direction side.

Also differently from the pawls 240, each of the pawls 250 has a structure in which the coupling plate 254 and release plate 256 are coplanar with the main body 252 at a side thereof opposite to a side facing the base portion 94, and the coupling plate 254 and release plate 256 protrude further than the main body 252 to the base portion 94 side thereof. Accordingly, if the coupling plate 254 of the pawl 250 is rotated about the boss 124 by a predetermined angle in the drawing direction, an angled portion of a distal end 254A of the coupling plate 254 abuts against the outer peripheral portion of the adaptor 112 between one and another of the outward teeth 122. Hence, when the distal end 254A is in contact with a winding direction side face of one of the outward teeth 122, rotation of the adaptor 112 in the winding direction is restricted.

The clutch 220 is further provided with an inertial plate 260, which serves as the coupling compelling member. The inertial plate 260 is provided with a substantially plate-like base portion 262, whose thickness direction is set along the axial direction of the base plate 92 and the adaptor 112. A round hole 264 is formed in the base portion 262. An internal diametric dimension of the round hole 264 is very slightly larger than an external diametric dimension of the tube portion 114, which is formed coaxially with respect to the outer peripheral portion of the adaptor 112 at the axial direction one end side of the adaptor 112. Consequent to assembly such that the tube portion 114 passes through the round hole 264, the base portion 262, and hence the inertial plate 260, is supported at the adaptor 112 to be rotatable about the adaptor 112.

A pair of blocks 266, which serves as the coupling compelling means, is formed at the base portion 94 side of the base portion 262. These blocks 266 are formed so as to oppose one another across the round hole 264. One of the aforementioned bosses 124 is disposed in a gap between the pair of blocks 266 at an outer side of the round hole 264. The other boss 124 is disposed in another gap between the pair of blocks 266, at a side of the round hole 264 which is opposite to the side thereof at which the gap mentioned above is formed.

A spring accommodation portion 268 is formed at an outer peripheral portion of one of the pair of blocks 266 (at an outer side face, in a radial direction of the round hole 264, of the block 266). A compression coil spring 270, which serves as the urging means, is accommodated at the spring accommodation portion 268.

The compression coil spring 270 is accommodated at the spring accommodation portion 268 in a state such that the compression coil spring 270 is curved peripherally to the center of the round hole 264. An end portion of the compression coil spring 270, at the winding direction side thereof, abuts against a wall portion 268A of the spring accommodation portion 268. An end portion of the compression coil spring 270 at the drawing direction side thereof abuts against the abutting wall 152. In the present embodiment, the abutting wall 152 protrudes from the inner peripheral portion of the peripheral wall 96 of the base plate 92 and enters into the spring accommodation portion 268.

Because the inertial plate 260 is rotatably supported at the tube portion 114 of the adaptor 112, in basic terms, the adaptor 112 is also relatively rotatable with respect to the base plate 92. However, as described above, the winding direction side end portion of the compression coil spring 270 abuts against the wall portion 268A of the spring accommodation portion 268 and the drawing direction side end portion of the same abuts against the abutting wall 152 of the base plate 92. Therefore, if the base plate 92 starts to rotate relatively in the winding direction with respect to the inertial plate 260, the abutting wall 152 pushes the inertial plate 260 in the winding direction via the compression coil spring 270, and the inertial plate 260 rotates to follow the rotation of the base plate 92. Therefore, as long as a rotation force large enough to counteract the urging force of the compression coil spring 270 does not act on the inertial plate 260, relative rotation of the base plate 92 in the winding direction relative to the inertial plate 260 is limited.

Meanwhile, a spring accommodation portion 272 is formed at an outer peripheral portion of the other of the pair of blocks 266 (at an outer side face, in a radial direction of the round hole 264, of the block 266). A compression coil spring 274, which serves as the urging means, is accommodated at the spring accommodation portion 272. The spring accommodation portion 272, the compression coil spring 274 and an abutting wall 272A are provided symmetrically with the spring accommodation portion 268, the compression coil spring 270 and the abutting wall 152 with respect to the center of the round hole 264. Accordingly, if the base plate 92 rotates about the adaptor 112 in the drawing direction, the compression coil spring 274 rotates the inertial plate 260 in the drawing direction, by urging force of the compression coil spring 274, so as to follow the base plate 92.

Thus, the urging forces of the compression coil spring 270 and the compression coil spring 274 on the inertial plate 260 act in opposite directions around the center of the base plate 92 and inertial plate 260. In consequence, a rotational position of the inertial plate 260 relative to the base plate 92 is usually maintained at a position at which the respective urging forces of the compression coil spring 270 and the compression coil spring 274 balance out.

Pushing portions 276 are formed at inner peripheral portions of the blocks 266. These pushing portions 276 are formed at winding direction sides of the pawls 240. An inclined surface 278 is formed at a width direction outer end of the coupling plate 244 of each pawl 240, to correspond with the pushing portion 276. The inclined surface 278 is inclined toward the radial direction outer side of the base plate 92 with respect to the winding direction. In the state in which the distal end 244A is not in contact with the outer peripheral portion of the adaptor 112, the inclined surface 278 faces the pushing portion 276 along the peripheral direction of the base plate 92 and the inertial plate 260.

The pushing portion 276 is formed so as to abut against the inclined surface 278 when the base plate 92 relatively rotates in the winding direction by a predetermined amount with respect to the inertial plate 260. From this abutting state, when the base plate 92 starts to rotate further in the winding direction with respect to the inertial plate 260, the pushing portion 276 pushes in the drawing direction against the inclined surface 278, and this pushing force rotates the pawl 240 in the winding direction about the boss 124.

Pushing portions 280 are formed at inner peripheral portions of the blocks 266. These pushing portions 280 are formed at sides of central portions of the blocks 266 which are opposite, along the peripheral direction of the inertial plate 260, to the sides thereof at which the pushing portions 276 are formed. The pushing portions 280 are formed at drawing direction sides of the pawls 250. An inclined surface 282 is formed at a width direction outer end of the coupling plate 254 of each pawl 250, to correspond with the pushing portion 280. The inclined surface 282 is inclined toward the radial direction outer side of the base plate 92 with respect to the drawing direction. In the state in which the distal end 254A is not in contact with the outer peripheral portion of the adaptor 112, the inclined surface 282 faces the pushing portion 280 along the peripheral direction of the base plate 92 and inertial plate 260.

The pushing portion 280 is formed so as to abut against the inclined surface 282 when the base plate 92 relatively rotates in the drawing direction by a predetermined amount with respect to the inertial plate 260. From this abutting state, when the base plate 92 starts to relatively rotate further in the drawing direction with respect to the inertial plate 260, the pushing portion 280 pushes in the winding direction against the inclined surface 282, and this pushing force rotates the pawl 250 in the drawing direction about the boss 124.

The pushing portion 166 is formed at a winding direction side end portion, along the peripheral direction of the inertial plate 260, of each of the blocks 266, and the release plate accommodation portion 168 is formed at the inertial plate 260 axial center side relative to the pushing portion 166. The pushing portion 166 is formed to correspond, along the peripheral direction of the inertial plate 260, with the release plate 246 of the pawl 240.

From a portion of the release plate 246 that is joined with the main body 242 (a proximal end portion of the release plate 246) toward a distal end side of the release plate 246, the release plate 246 is gradually curved toward the base plate 92 axial center side thereof. A width direction outer side face of the release plate 246 is curved in a similar manner. Accordingly, if the base plate 92 relatively rotates by a predetermined amount in the drawing direction relative to the inertial plate 260, the pushing portion 166 abuts against the width direction outer side face of the release plate 246. From this abutting state, if the base plate 92 relatively rotates further in the drawing direction with respect to the inertial plate 260, the pushing portion 166 pushes in the winding direction against the distal end portion of the release plate 246.

Here, the distal end of the release plate 246 is set to be an inclined surface which is angled outward in the radial direction of the inertial plate 260 relative to the drawing direction. Accordingly, when the pushing portions 166 press the distal ends of the release plates 246, the pawls 240 are rotated about the bosses 124 in the drawing direction, and are guided to the release plate accommodation portions 168.

Correspondingly, a pushing portion 284 is formed at a drawing direction side end portion, along the peripheral direction of the inertial plate 260, of each of the blocks 266, and a release plate accommodation portion 286 is formed at the inertial plate 260 axial center side relative to the pushing portion 284. The pushing portion 284 and release plate accommodation portion 286 are formed to be symmetrical with the pushing portion 166 and release plate accommodation portion 168 about the peripheral direction center of the block 266. With this structure, when the pushing portions 284 abut against width direction outer side faces of the release plates 256 and push in the drawing direction against the release plates 256, the pawls 250 are rotated about the bosses 124 in the winding direction, and are guided to the release plate accommodation portions 286.

The spacer 118, which is formed of a synthetic resin material in a ring shape, is disposed between the base portion 262 of the inertial plate 260 and the base portion 94 of the base plate 92. The spacer 118 is supported at the tube portion 114 of the adaptor 112. An axial direction one end face of the spacer 118 abuts against the base portion 262 of the inertial plate 260, and an axial direction other end face of the spacer 118 abuts against the end face of the portion joining the tube portion 114 with the main body portion of the adaptor 112.

At the clutch 220 with the structure described above, the external gear 102 meshes with a gear 212.

Operations and Effects of the Present Embodiment

Operation of the Webbing Winding Device 210 at a Time of Approaching a Frontward Obstacle Similarly to the first embodiment, when the ECU 52 has judged, based on the electronic signal from the forward surveillance sensor 54, that the distance to the obstacle is less than the predetermined value, the ECU 52 outputs a control signal to the driver 46, and electric current flows to the motor 44 via the driver 46. Thus, the motor 44 is driven to forward-rotate at a speed of at least a predetermined value, and the output shaft 50 is forward-rotated. The rotation of the output shaft 50 is transmitted to the external gear 102 of the clutch 220 via the gears 56 and 212 while being reduced in speed. Thus, the external gear 102 rotates in the winding direction at a rotation speed of at least a predetermined value. Because the external gear 102 is mechanically coupled to the base plate 92 via the torque limiter 222, when the external gear 102 rotates in the winding direction, the base plate 92 rotates in the winding direction integrally therewith.

When the base plate 92 rotates in the winding direction, the abutting wall 152 pushes the drawing direction side end portion of the compression coil spring 270, and the compression coil spring 270 pushes the wall portion 268A of the spring accommodation portion 268 by the urging force thereof. Hence, the inertial plate 260 rotates to follow the base plate 92. However, the inertial plate 260 basically acts to stay in the same place by inertia due to mass thereof. Therefore, when the base plate 92 is suddenly rotated at the speed of at least the predetermined value by the driving force of the motor 44, the base plate 92 relatively rotates in the winding direction relative to the inertial plate 260 (that is, against the urging force of the compression coil spring 270) before the urging force of the compression coil spring 270 can cause the inertial plate 260 to rotate to follow the base plate 92.

When the base plate 92 relatively rotates by at least a predetermined amount in the winding direction relative to the inertial plate 260 in this manner, the pushing portions 276, which are formed at the blocks 266 of the inertial plate 260, abut against the coupling plates 244 of the pawls 240. When, in this state, the base plate 92 acts to relatively rotate further in the winding direction with respect to the inertial plate 260, the pushing portions 276 push in the drawing direction against the inclined surfaces 278 of the coupling plates 244.

The pushing forces applied to the inclined surfaces 278 act both in the drawing direction and inward in the radial direction of the inertial plate 260 and base plate 92. The components that act inward in the radial direction cause the pawls 240 to rotate in the winding direction about the bosses 124. When the pawls 240 rotate about the bosses 124 in the winding direction, the angled portions of the distal ends 244A are abutted against the outer peripheral portion of the adaptor 112, as shown in FIG. 11. In this state, the pawls 240 rotate in the winding direction about the center of the base plate 92, together with the base plate 92, until the angled portion of one of the distal ends 244A abuts against the nearest of the outward teeth 122 at the winding direction side of the angled portion.

Subsequently, from this state, when the distal end 244A abuts against this outward tooth 122 and the base plate 92 rotates further in the winding direction, the distal end 244A of the pawl 240 pushes the outward tooth 122 in the winding direction. Thus, the adaptor 112, and hence the spool 20, is rotated in the winding direction. The webbing belt 28 is wound on at the spool 20 by this rotation of the spool 20. As a result, looseness of the webbing belt 28, known as "slack", is eliminated and a restraining force from the webbing belt 28 on the occupant's body is raised. Temporarily thereafter, even if the occupant carries out an operation of rapid control of the vehicle (emergency braking) and the vehicle enters a rapid deceleration state, the webbing belt 28 assuredly holds the body of the occupant.

When the motor 44 stops in this state, in which the slack has been eliminated thus, rotation of the base plate 92 in the winding direction stops. When the rotation of the base plate 92 stops, the compression coil spring 270 pushes the inertial plate 260 in the winding direction by the urging force thereof, and the inertial plate 260 is rotated in the winding direction to the position at which the urging force of the compression coil spring 270 and the urging force of the compression coil spring 274 balance out.

When the inertial plate 260 rotates thus, the pushing portions 166 abut against the release plates 246 of the pawls 240 and push in the winding direction against the release plates 246. When the release plates 246 are subjected to these pushing forces, the pawls 240 rotate in the drawing direction about the bosses 124, and the distal ends 244A of the coupling plates 244 are separated from the outer peripheral portion of the adaptor 112. As a result, the mechanical coupling of the base plate 92 with the adaptor 112, which is to say the mechanical coupling of the output shaft 50 of the motor 44 with the compression coil spring 270, is released.

In the present embodiment too, the total number of the outward teeth 122 of the adaptor 112 is set to an odd number. Thus, in the state in which the distal end 244A of one of the pawls 240 abuts against the outward teeth 122, the distal end 244A of the other pawl 240 is separated from the outward teeth 122 along the peripheral direction of the adaptor 112. Thus, the distal end 244A of the other pawl 240 is located at an intermediate portion along the peripheral direction of the adaptor 112, between the nearest thereto of the outward teeth 122 in the winding direction and the nearest thereto of the outward teeth 122 in the drawing direction.

Therefore, similarly to the first embodiment, even if the distal end 244A of one pawl 240 is abutted against a tooth peak of the outward teeth 122 and cannot mesh with the outward teeth 122, the distal end 244A of the other pawl 240 will assuredly mesh with the outward teeth 122 when the base plate 92 has rotated by an amount corresponding to substantially half of the pitch of the outward teeth 122. Thus, the rotation of the base plate 92 can be quickly and assuredly transmitted to the adaptor 112, and the rotation force of the motor 44 can be transmitted to the spool 20.

Further, similarly to the first embodiment, if the rotation force of the motor 44 has started the spool 20 winding up the webbing belt 28 more than is required and a counterforce (tension force) applied to the webbing belt 28 from the body of the occupant has stopped the spool 20, the base plate 92, via the torque limiter 222, limits rotation of the external gear 102 in the winding direction.

In the state in which rotation of the external gear 102 is limited thus by the base plate 92 via the torque limiter 222, if the external gear 102 starts to rotate further in the winding direction, the rotation force at this time overcomes the spring force of the spring plates 230 structuring the torque limiter 222, and the engaging portions 106 of the spring plates 230 are disengaged from the engaging recess portions 100. As a result, the coupling of the base plate 92 with the external gear 102 is temporarily released, and the external gear 102 rotates in the winding direction until the engaging portions 106 enter into others of the engaging recess portions 100, which are adjacent to the engaging recess portions 100 mentioned above. Thus, when the coupling of the base plate 92 and the external gear 102 is released, transmission of the rotation force of the external gear 102 to the base plate 92, which is to say transmission of the rotation force of the motor 44 to the spool 20, is blocked. Therefore, an increase in the restraining force from the webbing belt 28 can be suppressed.

Operation of the Webbing Winding Device 210 at a Time of Ceasing Approaching an Obstacle A case in which an approach of the vehicle to an obstacle as described above is cancelled, that is, a case in which the vehicle decelerates or stops and a vehicle which is running at the front side moves further away or the like, will be described. In such a state, an electronic signal corresponding to the distance to the obstacle is outputted from the forward surveillance sensor 54 and inputted to the ECU 52. When the ECU 52 judges that the distance to the obstacle is not less than the predetermined value, the ECU 52 first confirms, from a memory or the like, whether or not the slack has been eliminated in a current state.

When the ECU 52 has judged that the distance to the obstacle is not less than the predetermined value and confirmed that the slack has been eliminated in the current state, the ECU 52 outputs a control signal to the driver 46, and electric current flows to the motor 44 via the driver 46. The current at this time flows in the opposite direction to the current that flowed for the case of eliminating the slack. Accordingly, the motor 44 reverse-rotates at the speed of at least a predetermined value, the output shaft 50 reverse-rotates, and the external gear 102 is rotated in the drawing direction at the rotation speed of at least a predetermined value. The rotation of the external gear 102 in the drawing direction is transmitted to the base plate 92 via the torque limiter 222, and the base plate 92 is rotated in the drawing direction at a speed at or above a predetermined value.

In a similar manner to the case in which the base plate 92 rotates in the winding direction at the speed of at least the predetermined value, when the base plate 92 rotates in the drawing direction at the speed of at least the predetermined value, the base plate 92 rotates relatively in the drawing direction with respect to the inertial plate 260, which acts to stay still due to inertia. When the base plate 92 has relatively rotated by at least a predetermined amount in the drawing direction relative to the inertial plate 260, the pushing portions 280 formed at the blocks 266 of the inertial plate 260 abut against the coupling plates 254 of the pawls 250.

When, in this state, the base plate 92 starts to relatively rotate further in the drawing direction relative to the inertial plate 260, the pushing portions 280 press in the winding direction against the inclined surfaces 282 of the coupling plates 254. The pushing forces applied to the inclined surfaces 282 act both in the winding direction and inward in the radial direction of the inertial plate 260 and the base plate 92, and the components that act inward in the radial direction cause the pawls 250 to rotate in the drawing direction about the bosses 124.

As shown in FIG. 12, when the pawls 250 rotate in the drawing direction about the bosses 124, the angled portions of the distal ends 254A abut against the outer peripheral portion of the adaptor 112. In this state, the pawls 250 rotate in the drawing direction about the center of the base plate 92, together with the base plate 92, until the angled portion of one of the distal ends 254A abuts against the nearest of the outward teeth 122 at the drawing direction side of the angled portion.

Subsequently, from this state, when the distal end 254A abuts against this outward tooth 122 and the base plate 92 rotates further in the drawing direction, the distal end 254A of the pawl 250 pushes the outward tooth 122 in the drawing direction and the adaptor 112, and hence the spool 20, is rotated in the drawing direction. The tightened winding of the webbing belt 28 at the spool 20 is loosened by this rotation of the spool 20, and a sensation of pressure caused to the occupant's body by the webbing belt 28 is alleviated.

When the motor 44 stops in this state, rotation of the base plate 92 in the drawing direction stops. When the rotation of the base plate 92 stops, the compression coil spring 274 pushes the inertial plate 260 in the drawing direction by the urging force thereof, and the inertial plate 260 is rotated in the drawing direction to the position at which the urging force of the compression coil spring 274 and the urging force of the compression coil spring 270 balance out. When the inertial plate 260 rotates thus, the pushing portions 166 abut against the release plates 256 of the pawls 250, and push in the drawing direction against the release plates 256.

When the release plates 256 are subjected to these pushing forces, the pawls 250 rotate in the winding direction about the bosses 124, and the distal ends 254A of the coupling plates 254 are separated from the outer peripheral portion of the adaptor 112. As a result, the mechanical coupling of the base plate 92 with the adaptor 112, which is to say the mechanical coupling of the output shaft 50 of the motor 44 with the compression coil spring 274, is released.

Thus, the clutch 220 of the webbing winding device 210 has a structure which can transmit rotation of the external gear 102 to the adaptor 112 and, in contrast, not transmit rotation from the adaptor 112 to the external gear 102, regardless of whether the rotation is in the winding direction or the drawing direction. Therefore, the spool 20 can be rotated in either the winding direction or the drawing direction simply by forward-rotation driving or reverse-rotation driving of the motor 44 at a speed equal to or greater than the predetermined value.

Accordingly, as described above, a restraining force from the webbing belt 28 can be increased in a case in which a distance between the vehicle and an obstacle has become small, and a sensation of pressure experienced because of the webbing belt 28 can be moderated when the separation between the vehicle and the obstacle has become large again. Furthermore, the transmission of rotation in both directions is realized essentially by providing the pawls 240 for transmitting winding direction rotation and the pawls 250 for transmitting drawing direction rotation. Thus, the structure of the clutch 220 can be small and simple. As a result, a reduction in size and a lowering of costs of the webbing winding device 210 can be expected.

As is described hereabove, the clutch 220 differs from the clutch 90 of the first embodiment in being a structure which is capable of transmitting the rotation of the external gear 102 to the adaptor 112 in both the winding direction and the drawing direction. Further, in contrast to the narrow-width plate form torque limiters 104 utilized in the clutch 90, the torque limiter 222 of the clutch 220 is formed in a tubular shape.

However, because the torque limiter 222 is disposed between the external gear 102 and the peripheral wall 96, in addition to which the axial direction dimension of the torque limiter 222, which corresponds to the width dimension of the torque limiters 104, is less than the axial direction dimension of the external gear 102, the clutch 220 is the same as the clutch 90 in regard to being disposed between the external gear 102 and the peripheral wall 96.

In the clutch 90, the pawls 130 are disposed between the peripheral wall 96 and the adaptor 112, and in the clutch 220, the pawls 240, the pawls 250 and the inertial plate 260 are disposed between the peripheral wall 96 and the adaptor 112. Therefore, the overall thickness dimension of the clutch 220 can be set to about the same level as the axial direction dimension of the external gear 102. Accordingly, the clutch 220 can be made thinner and the webbing winding device 210 can be made smaller.

The present embodiment is a structure which applies reverse-rotation driving force of the motor 44 as rotation force of the spool 20 in the drawing direction for alleviating the sensation of pressure from the webbing belt 28. However, structures are also possible which apply the reverse-rotation driving force of the motor 44 as rotation force of the spool 20 in the drawing direction for other purposes, such as, for example, assisting when the occupant is pulling on the webbing belt 28 at a time of applying the webbing belt 28, and the like.

Structure of Third Embodiment

Next, a third embodiment of the present invention will be described.

Figure 13:
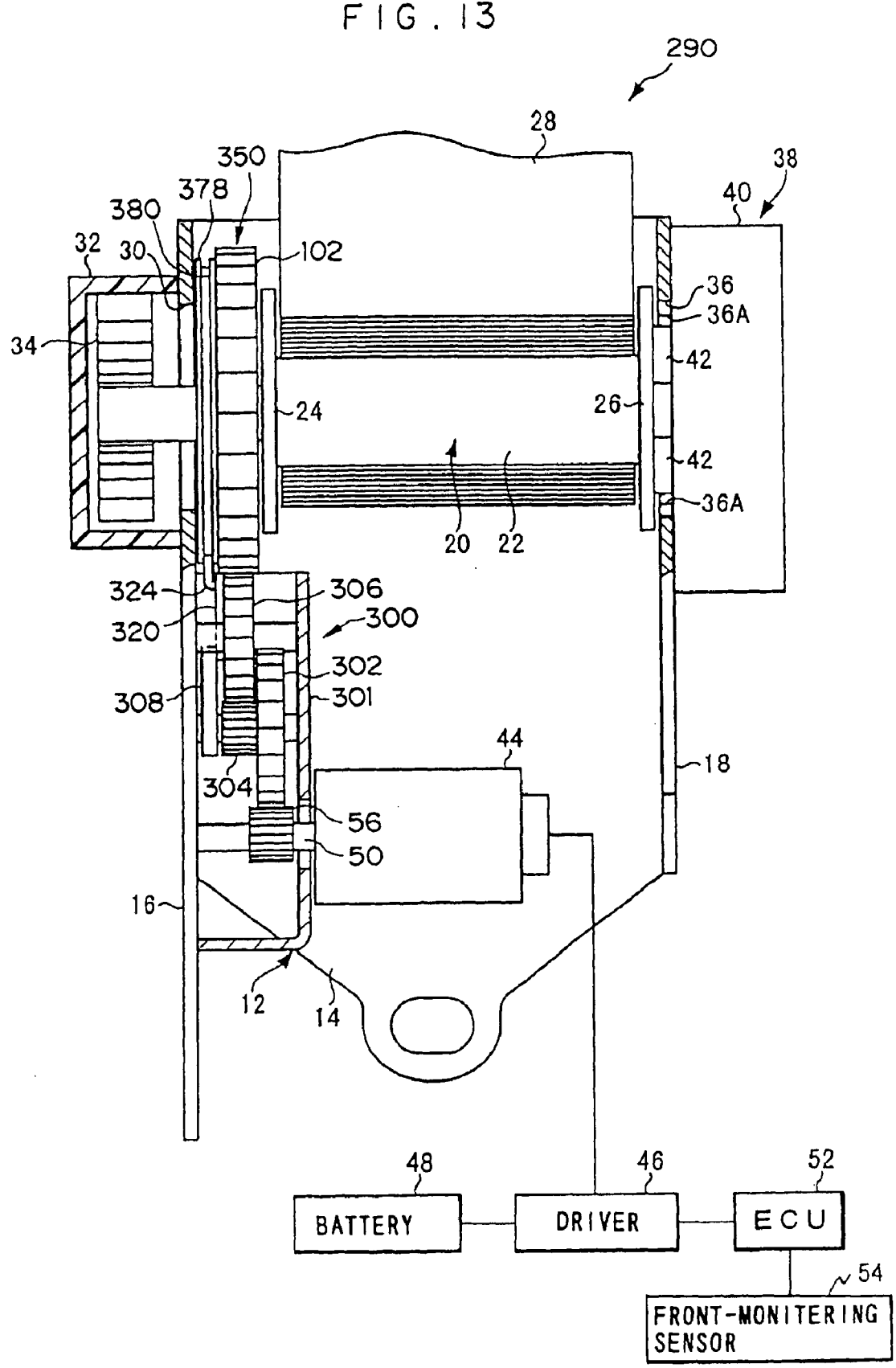
FIG. 13 is a front view showing general structure of a clutch mechanism of a webbing winding device relating to a third embodiment of the present invention.

As shown in FIG. 13, a webbing winding device 290 relating to the present embodiment differs from the webbing winding device 10 relating to the first embodiment in that a braking mechanism 300 and a clutch 350, which serves as the clutch mechanism, are provided instead of the braking mechanism 60 and the clutch 90.

Structure of Braking Mechanism 300

Figure 14:
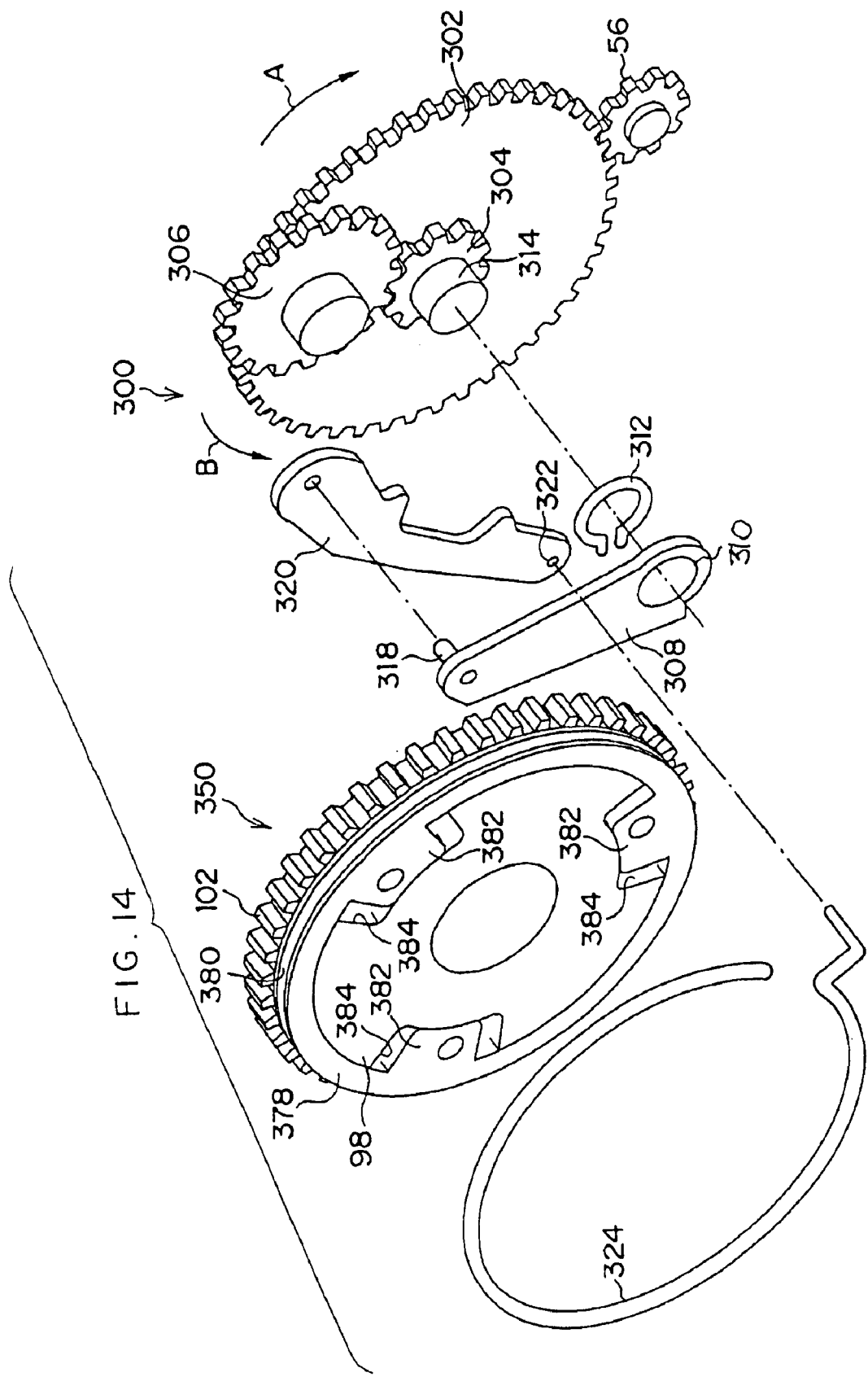
FIG. 14 is an exploded perspective view showing general structure of a braking mechanism of the webbing winding device relating to the third embodiment of the present invention.
Figure 15:
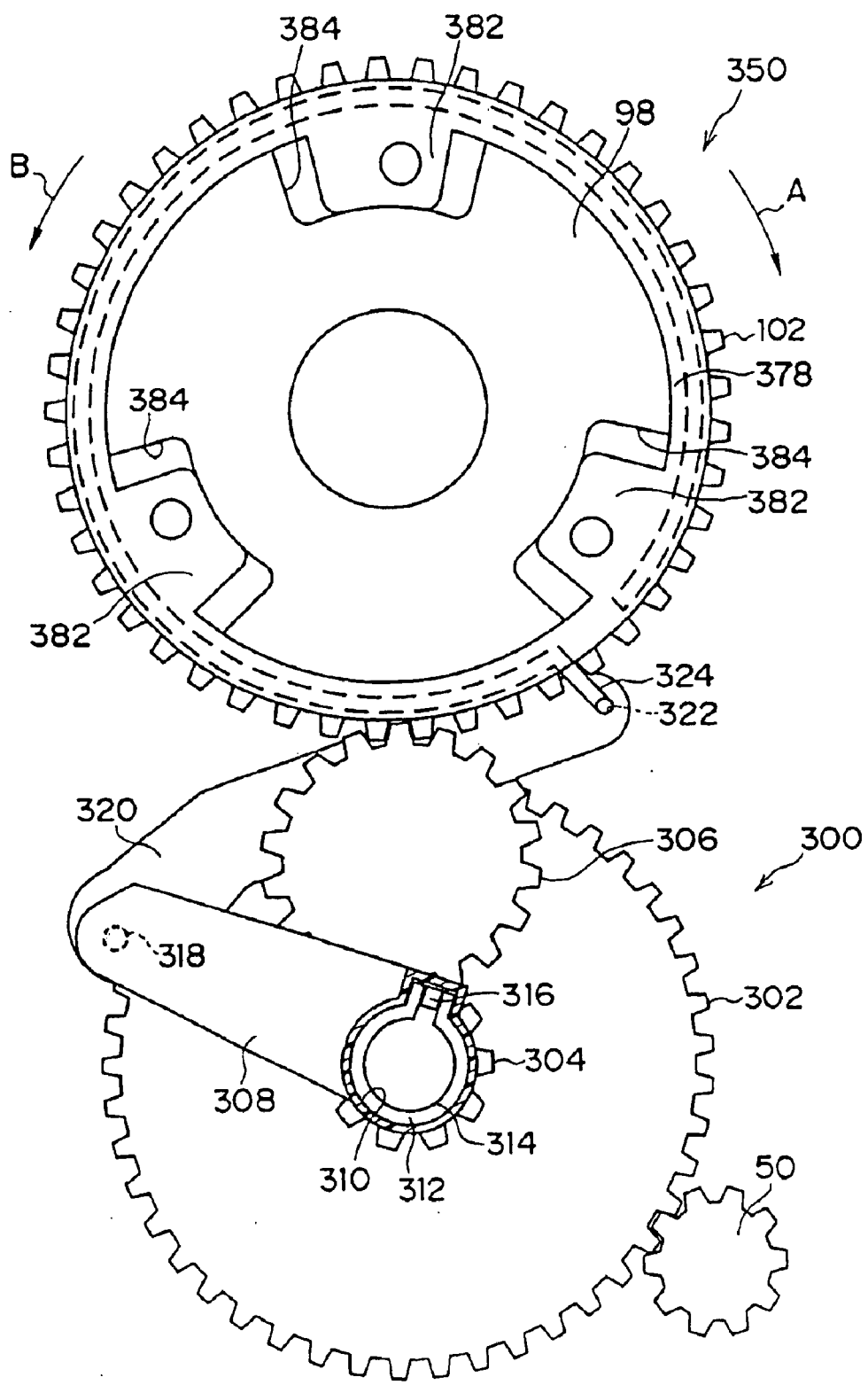
FIG. 15 is a side view showing general structure of the braking mechanism of the webbing winding device relating to the third embodiment of the present invention.

As shown in FIGS. 13 and 14, the gear 56 is coaxially and integrally provided at the distal end portion of the output shaft 50 of the motor 44, and the gear 56 meshes with a gear 302 with outward teeth, which structures the braking mechanism 300. The gear 302 has a significantly larger number of teeth than the gear 56, and the two axial direction ends of the gear 302 are rotatably supported at the leg plate 16 of the frame 12 and a frame 301 of the braking mechanism 300.

At the leg plate 16 side of the gear 302, a gear 304 is provided coaxially and integrally with respect to the gear 302. The gear 304 has a significantly smaller number of teeth than the gear 302. Upward of the gear 304, a gear 306 is rotatably supported at the leg plate 16 and the frame 301 in a state of being meshed with the gear 304. The gear 306 has a greater number of teeth than the gear 304. Upward of the gear 306, the external gear 102 with outward teeth meshes with the gear 306. The external gear 102 structures the clutch 350, which is described below, and serves as the motor side rotating body. Rotation of the 50 is transmitted to the external gear 102 via the gears 56, 302, 304 and 306, and reduced in speed.

An arm 308 is provided at the leg plate 16 side of the gear 304. The arm 308 is a plate-form member with a long direction set along a radial direction with respect to rotation of the gear 302 and a thickness direction set along the axial direction of the gear 302. A substantially circular spring accommodation portion 310 is formed at a long direction proximal end side of the arm 308.

A friction spring 312 is accommodated at this spring accommodation portion 310. The friction spring 312 is formed substantially in a ring shape overall. An inner peripheral portion of the friction spring 312 slides against a shaft portion 314, which is integral with the gear 304. Two peripheral direction ends of the friction spring 312 are inflected to the radial direction outer side thereof.

A wall portion 316 is formed at the spring accommodation portion 310 in correspondence with a location between the two inflected ends of the friction spring 312. If the friction spring 312 starts to rotate about the shaft portion 314 relative to this arm 308, one or other of the two ends of the friction spring 312 interferes with the wall portion 316, and the friction spring 312 pushes the wall portion 316 in a rotation direction thereof.

A shaft portion 318 is formed protruding from a distal end side of the arm 308 toward the gear 302. A proximal end portion of a lever 320 is rotatably supported at the shaft portion 318 to be rotatable about the shaft portion 318. The lever 320 is a plate-form member with a length direction along a radial direction of the shaft portion 318 and a thickness direction along a thickness direction of the gear 302. At a length direction distal end side of the lever 320, a through-hole 322 is formed passing through the lever 320 in the thickness direction thereof. A drawing direction side end portion of a brake spring 324 is fitted in at the through-hole 322. The brake spring 324 is formed substantially in a ring shape.

Structure of the Clutch 350

Figure 16:
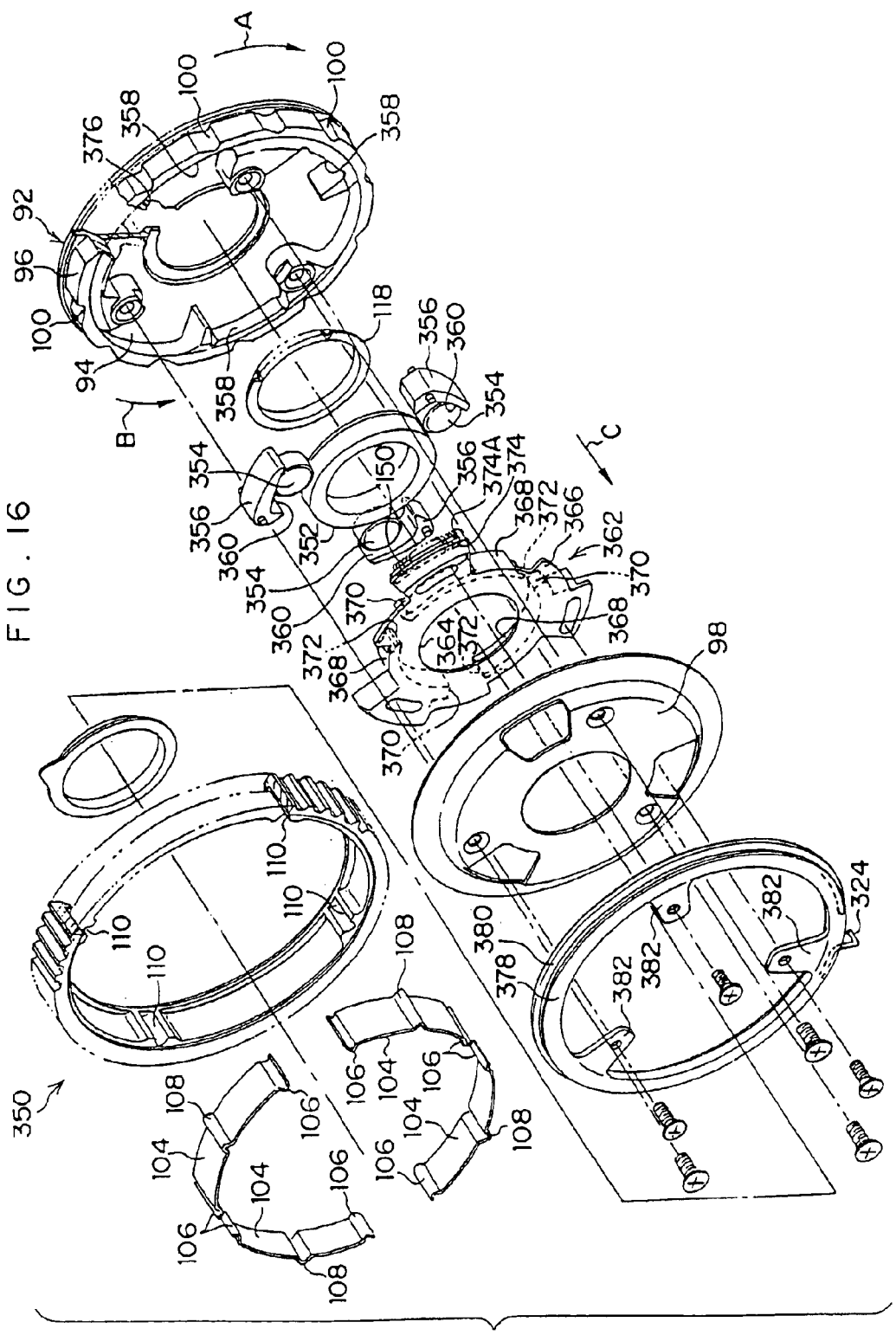
FIG. 16 is an exploded perspective view of a clutch mechanism of the webbing winding device relating to the third embodiment of the present invention.

The external gear 102 structures the clutch 350. As shown in FIG. 16, the clutch 350 at which the external gear 102 is provided is equipped with the base plate 92. At the base plate 92, the substantially ring-shaped peripheral wall 96 is formed along the outer peripheral portion of the circular disc-form base portion 94, and the base plate 92 is formed in the tubular shape with a bottom (or shallow-bottomed tray shape), whose dimension in the axial direction thereof is extremely short. At the opening end at the one end side in the axial direction of the base plate 92 (the side shown by the direction of an arrow C in FIG. 16), the thin, circular disc-form cover 98 is attached. The cover 98 basically closes off the open end of the base plate 92.

The engaging recess portions 100 are formed at the outer peripheral portion of the peripheral wall 96, at a certain spacing along the peripheral direction thereof. The external gear 102 is disposed coaxially with the base plate 92 at the outer side of the peripheral wall 96. The external gear 102 is formed substantially in a ring shape, with a significantly greater number of teeth than the gear 302. The internal diametric dimension of the external gear 102 is significantly greater than the external diametric dimension of the peripheral wall 96, and the annular gap is formed between the inner peripheral portion of the external gear 102 and the outer peripheral portion of the peripheral wall 96. The plurality of torque limiters 104 is disposed, noncontinuously in the peripheral direction, in the annular gap.

The torque limiters 104 are the narrow-width plate-form metal pieces having springiness, and the engaging portions 106, which can enter into the engaging recess portions 100, are formed at both length direction end portions of each of the torque limiters 104. The engaging protrusions 108, which are inflected so as to protrude substantially in the direction opposite to the direction in which the engaging portions 106 protrude, are formed at the length direction substantially central portions of the torque limiters 104.

The engaging recess portions 110 are formed at the inner peripheral portion of the external gear 102 in correspondence with the engaging protrusions 108. In the state in which the engaging protrusions 108 are entered into the engaging recess portions 110, the base plate 92 is substantially integrally coupled with the external gear 102 via the torque limiters 104, by the engaging portions 106 entering into the engaging recess portions 100.

Accordingly, when the external gear 102 starts to rotate relative to the base plate 92 about the axial center of the base plate 92, the torque limiters 104 naturally also start to rotate integrally with the external gear 102. However, because the engaging portions 106 of the torque limiters 104 are entered into the engaging recess portions 100, when the engaging portions 106 act to rotate along the peripheral direction of the peripheral wall 96, the engaging recess portions 100 interfere with the engaging portions 106, and restrict rotation of the engaging portions 106.

Consequently, relative rotation of the external gear 102 with respect to the base plate 92 is restricted. Thus, in this structure, the external gear 102 and the base plate 92 are basically integrally coupled.

However, because the torque limiters 104 are the metallic pieces having springiness as described above, if a rotation force generated by relative rotation of the external gear 102 relative to the base plate 92 is large enough to remove the engaging portions 106 from the engaging recess portions 100 against the spring force (urging force) of the torque limiters 104, the hindrance of the engaging portions 106 by the engaging recess portions 100 is released. Thus, this structure enables relative rotation of the external gear 102 relative to the base plate 92.

Meanwhile, at the inner side of the base plate 92, an adaptor 352 is disposed substantially coaxially with the base plate 92. The adaptor 352 has a substantially tubular shape and serves as the slave shaft and as the inner side rotating body. The adaptor 352 is formed overall in a thick ring shape whose thickness direction (axial direction) is set along the axial direction of the base plate 92. The aforementioned spool 20 is integrally and coaxially fitted in at the adaptor 352. An end portion of the adaptor 352 at the base portion 94 side thereof is fitted into the spacer 118, which is formed of the synthetic resin material in the ring shape. One end face of the spacer 118 in the axial direction (at a side thereof facing in a direction opposite to the direction of arrow C in FIG. 16) abuts against the base portion 94.

A plurality (three in the present embodiment) of coupling rollers 354, which each serve as the coupling member, are disposed at the outer side in the radial direction of the adaptor 352. The coupling rollers 354 are formed in substantially circular column shapes overall. Axial directions of the coupling rollers 354 are substantially in the same direction as the axial direction of the adaptor 352, that is, the axial direction of the spool 20. The coupling rollers 354 are provided with lock pieces 356, which serve as guide members, between the coupling rollers 354 and the peripheral wall 96 of the base plate 92.

The lock pieces 356 are formed of a material with comparatively high strength (for example, a mechanical strength which is significantly higher than that of a material forming the base plate 92). Piece-fitting portions 358 are formed at the inner peripheral portion of the peripheral wall 96. In a state in which the lock pieces 356 are fitted in at the piece-fitting portions 358, the lock pieces 356 are integrally fixed to the peripheral wall 96.

Sides of the lock pieces 356 that face the coupling rollers 354 along the radial direction of the adaptor 352 and base plate 92 serve as guide faces 360. The guide faces 360 are faces which are inclined or curved gradually such that separations thereof from an outer peripheral face of the adaptor 352 become smaller in the drawing direction about the axial center of the adaptor 352. With this structure, if the coupling rollers 354 rotate or move in the drawing direction along the guide faces 360, the coupling rollers 354 are forcibly brought closer to the outer peripheral face of the adaptor 352.

At a vicinity of an end portion at a drawing direction side of each guide face 360, a spacing (separation) of the guide face 360 from the outer peripheral face of the adaptor 352 is set to be the same as or very slightly smaller than an outer diametric dimension of the coupling roller 354. Therefore, when the coupling rollers 354 move to the drawing direction side end portion vicinities of the guide faces 360, the coupling rollers 354 come into contact with the outer peripheral portion of the adaptor 352.

A rotation disc 362, which serves as the coupling compelling member, is provided at a side of the coupling rollers 354 which is opposite to a side of the coupling rollers 354 at which the base portion 94 of the base plate 92 is disposed. The rotation disc 362 is provided with a plate-form base portion 366. A round hole 364 is formed in the base portion 366. The spool 20 passes through the round hole 364. Thus, in basic terms, the rotation disc 362 is relatively rotatable with respect to the spool 20 and the base plate 92 about the axial center of the spool 20.

Figure 17:
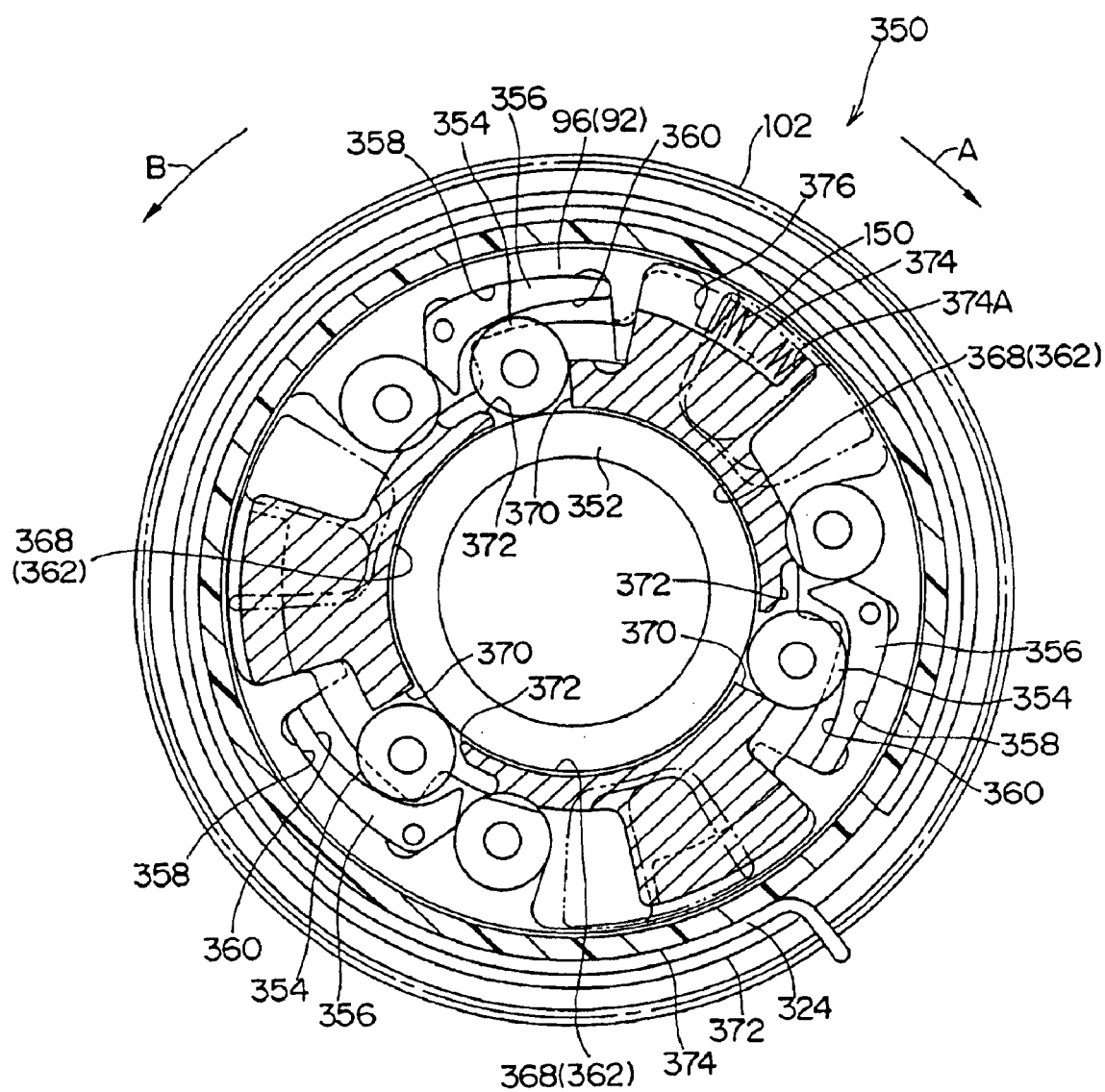
FIG. 17 is a side view showing structure of the clutch mechanism.

A plurality of peripheral walls 368 are formed at surroundings of the round hole 364 of the base portion 366. The peripheral walls 368, which are equal in number to the coupling rollers 354, are formed with a certain spacing along an imaginary circular periphery which is coaxial with the round hole 364. The coupling rollers 354 are disposed between the peripheral walls 368. Limiting walls 370, which serve as coupling compelling means, are formed at end portions of the peripheral walls 368 at drawing direction (the direction of arrow B in FIGS. 16 and 17) sides of the peripheral walls 368 about the axial center of the adaptor 352. If the coupling rollers 354 act to move by more than a predetermined amount in the winding direction about the axial center of the adaptor 352, outer peripheral portions of the coupling rollers 354 interfere with the limiting walls 370 and the movement of the coupling rollers 354 is limited.

Meanwhile, wedge-form portions 372, which serve as releasing compelling means, are formed at end portions of the peripheral walls 368 at winding direction (the direction of arrow A in FIGS. 16 and 17) sides of the peripheral walls 368 about the axial center of the adaptor 352. The wedge-form portions 372 are formed in tapered shapes whose thicknesses become gradually thinner in the winding direction. With this structure, if the rotation disc 362 rotates to the winding direction side relative to the coupling rollers 354, the wedge-form portions 372 interfere with the outer peripheral portions of the coupling rollers 354 at vicinities thereof near the outer peripheral portion of the adaptor 352, and the wedge-form portions 372 push the coupling rollers 354 in directions to separate from the outer peripheral portion of the adaptor 352.

A spring mounting portion 374 is formed at one of the plurality of peripheral walls 368. The compression coil spring 150, which serves as the urging member, is mounted at the spring mounting portion 374. The compression coil spring 150 is curved such that an axial direction thereof approximately follows the form of the inner periphery of the peripheral wall 96. A winding direction side end portion of the compression coil spring 150 abuts against a wall portion 374A of the spring mounting portion 374, and a drawing direction side end portion of the compression coil spring 150 abuts against an abutting wall 376, which is formed at the inner peripheral portion of the peripheral wall 96.

As described above, the rotation disc 362 is basically relatively rotatable about the axial center of the adaptor 352 with respect to the adaptor 352 and the base plate 92. However, in a case in which the base plate 92 starts to rotate relatively in the winding direction with respect to the rotation disc 362, the abutting wall 376 pushes the drawing direction side end portion of the compression coil spring 150 toward the winding direction side thereof. As a result, an increased urging force of the compression coil spring 150 pushes the wall portion 374A in the winding direction, and causes the rotation disc 362 to rotate in the winding direction.

Thus, in a case in which the base plate 92 acts to rotate relatively in the winding direction with respect to the rotation disc 362, the rotation disc 362 acts to follow the rotation of the base plate 92 due to the urging force of the compression coil spring 150.

Meanwhile, at a side of the cover 98 which is opposite to the thereof at which the rotation disc 362 is disposed (that is, an outer side of the cover 98), a friction ring 378 is disposed coaxially with the adaptor 352. The friction ring 378 is formed substantially in a ring shape overall. An annular accommodation groove 380, which accommodates the aforementioned brake spring 324, is formed at an outer peripheral portion of the friction ring 378. An outer diametric dimension at the accommodation groove 380, at a floor portion of the accommodation groove 380, is substantially equal to an inner diametric dimension of the brake spring 324. Thus, an inner peripheral portion of the brake spring 324 slides against the floor portion of the accommodation groove 380.

A plurality (three in the present embodiment) of tongue plate-form fitting pieces 382 protrude from an inner peripheral portion of the friction ring 378. Opening apertures 384 are formed in the cover 98. The fitting pieces 382 are integrally coupled to the base portion 366 of the rotation disc 362 by fixing means, such as screws or the like, which pass through the opening apertures 384. Thus, the rotation disc 362 and the friction ring 378 are made substantially integral.

At the clutch 350 with the structure described above, the external gear 102 meshes with the gear 306.

Operations and Effects of the Present Embodiment

Next, operations and effects of the present embodiment will be described through a description of operations of the webbing winding device 10.

Operation of the Webbing Winding Device 10 at a Time of Approaching a Frontward Obstacle In the present embodiment too, during running of the vehicle, the forward surveillance sensor 54 detects a distance to an obstacle frontward of the vehicle, and an electronic signal which includes a signal level corresponding to the distance to the obstacle is outputted from the forward surveillance sensor 54.

The electronic signal outputted from the forward surveillance sensor 54 is inputted to the ECU 52. At the ECU 52, it is judged, on the basis of the electronic signal from the forward surveillance sensor 54, whether or not the distance to the obstacle is less than a predetermined value.

Then, if the ECU 52 has judged that the distance to the obstacle is less than the predetermined value, the ECU 52 outputs a control signal to the driver 46, and electric current flows to the motor 44 via the driver 46. As a result, the motor 44 is driven to forward-rotate at the speed of at least a predetermined value, and the output shaft 50 is forward-rotated. The rotation of the output shaft 50 is transmitted to the external gear 102 of the clutch 350 while being reduced in speed via the gears 56, 302, 304 and 306. Thus, the external gear 102 rotates in the winding direction at the rotation speed of at least a predetermined value.

Because the external gear 102 is mechanically coupled to the base plate 92 via the torque limiters 104, when the external gear 102 rotates in the winding direction, the base plate 92 rotates in the winding direction integrally therewith.

When the base plate 92 rotates in the winding direction, the abutting wall 376 pushes the drawing direction side end portion of the compression coil spring 150, and the compression coil spring 150 pushes the wall portion 374A of the spring mounting portion 374 by the urging force thereof. Hence, the rotation disc 362 rotates to follow the base plate 92.

Meanwhile, when the rotation of the output shaft 50 is transmitted to the gear 302 by rotation of the gear 56 as described above and the gear 302 rotates, the shaft portion 314 rotates. When the shaft portion 314 rotates, a frictional force, which is generated between the shaft portion 314 and the inner peripheral portion of the friction spring 312, acts to rotate the friction spring 312. The friction spring 312 pushes the wall portion 316 by this transmitted rotation force, and rotates the arm 308 about the shaft portion 314.

When the arm 308 rotates, the distal end portion of the lever 320 rotates about the shaft portion 314. As a result, the lever 320 rotates one end (the end portion at the side engaged with the distal end of the lever 320) of the brake spring 324 to the drawing direction side thereof (the direction of the arrow B in FIGS. 16 and 17).

Because the inner peripheral portion of the brake spring 324 slides against the floor portion of the accommodation groove 380 of the friction ring 378 as described earlier, a frictional force is generated between the brake spring 324 and the floor portion of the accommodation groove 380 when the brake spring 324 rotates.

This frictional force works to restrain rotation of the brake spring 324. Consequently, the other end side of the brake spring 324 does not follow the rotation of the one end side thereof. As a result, the brake spring 324 tightens up to the floor portion of the accommodation groove 380. Thus, the brake spring 324 acts to rotate the friction ring 378, and hence the rotation disc 362 which is integral with the friction ring 378, in the drawing direction. As a result of this rotation of the rotation disc 362 in the drawing direction and the rotation force received from the external gear 102, the base plate 92 rotates relatively in the winding direction with respect to the rotation disc 362.

Accordingly, when the base plate 92 relatively rotates in the winding direction relative to the rotation disc 362, the guide faces 360 of the lock pieces 356, which are fixed at the base portion 94 of the base plate 92, push the coupling rollers 354 and rotate the coupling rollers 354 about the axial center of the adaptor 352 in the winding direction. When the coupling rollers 354 have rotated by a predetermined amount, the limiting walls 370 interfere with the outer peripheral portions of the coupling rollers 354, and the rotation of the coupling rollers 354 is limited.

When the guide faces 360 push the coupling rollers 354 further from this state, the coupling rollers 354 are moved to approach the outer peripheral portion of the adaptor 352. When the guide faces 360 have pushed the coupling rollers 354 until the coupling rollers 354 are in contact with the outer peripheral portion of the adaptor 352, the coupling rollers 354 are pressed in between the outer peripheral portion of the adaptor 352 and the guide faces 360. Thus, the coupling rollers 354 are pressure-contacted with both the outer peripheral portion of the adaptor 352 and the guide faces 360 (see FIG. 17).

Accordingly, the rotation of the base plate 92 is transmitted to the adaptor 352 via the lock pieces 356 and the coupling rollers 354. Thus, the adaptor 352, and hence the spool 20 which is integral with the adaptor 352, are rotated in the winding direction.

The webbing belt 28 is wound on at the spool 20 by this rotation of the spool 20. As a result, looseness of the webbing belt 28, known as "slack", is eliminated and the restraining force from the webbing belt 28 on the occupant's body is raised. Temporarily thereafter, even if the occupant carries out an operation of rapid control of the vehicle (emergency braking) and the vehicle enters a rapid deceleration state, the webbing belt 28 assuredly holds the body of the occupant.

When the motor 44 stops in this state, in which the slack has been eliminated thus, rotation of the base plate 92 in the winding direction stops. When the rotation of the base plate 92 stops, the compression coil spring 150 pushes the rotation disc 362 in the winding direction by the urging force thereof, and the rotation disc 362 rotates in the winding direction.

Figure 18:
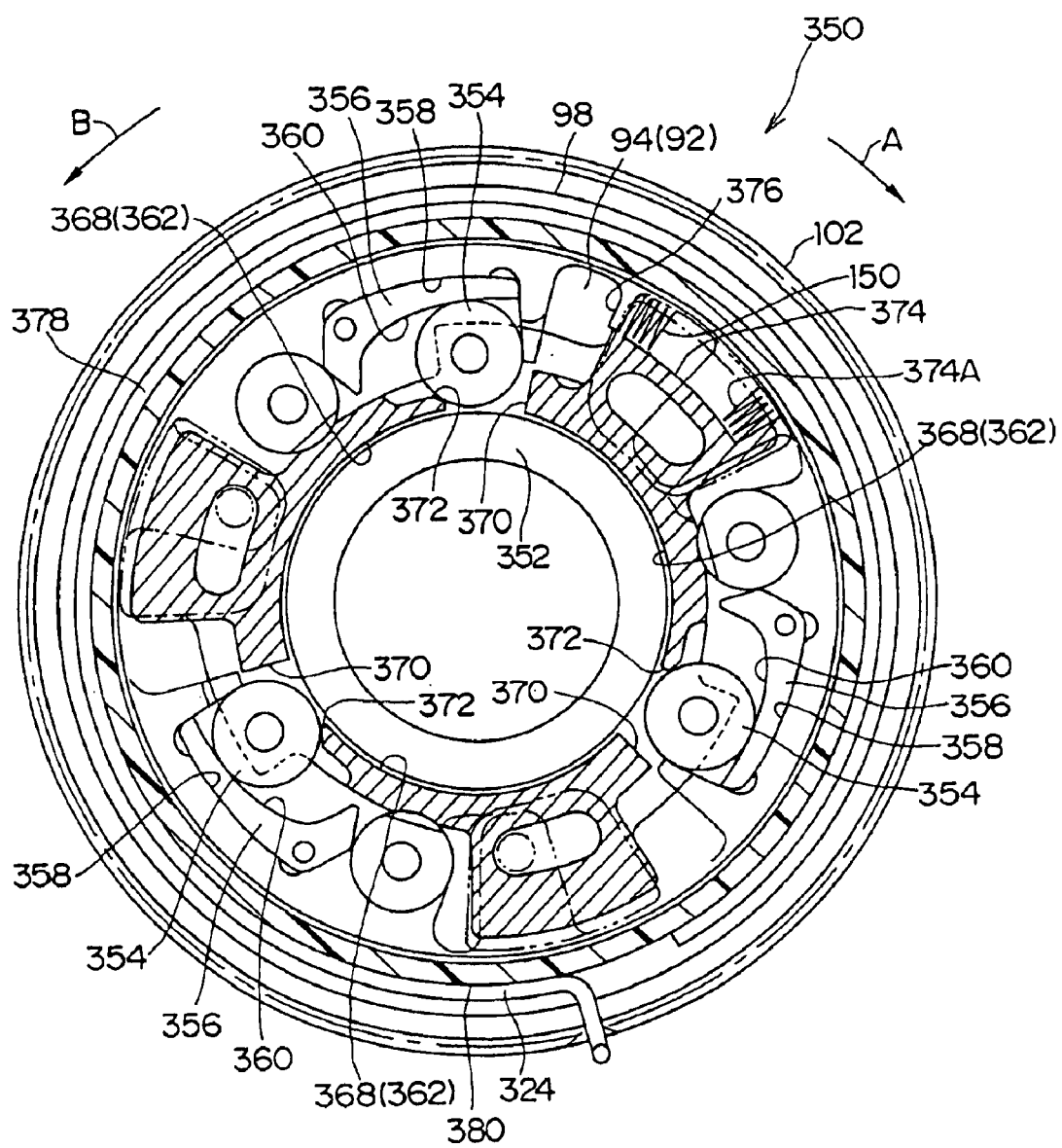
FIG. 18 is a side view corresponding to FIG. 17, showing a state in which coupling means is engaged at a slave shaft.

When the rotation disc 362 rotates thus, the wedge-form portions 372 push the outer peripheral portions of the coupling rollers 354 and move the coupling rollers 354 away from the outer peripheral portion of the adaptor 352. As a result, the mechanical coupling of the base plate 92 with the adaptor 352, which is to say the mechanical coupling of the output shaft 50 of the motor 44 with the compression coil spring 150, is released (see FIG. 18).

Accordingly, in the present embodiment, the wedge-form portions 372 forcibly separate the coupling rollers 354 from the outer peripheral portion of the adaptor 352. Therefore, the pressure-contacted state of the coupling rollers 354 with the outer peripheral portion of the adaptor 352 will not be undesiredly maintained by friction forces and the like that are generated between the coupling rollers 354 and the outer peripheral portion of the adaptor 352.

In this structure, the coupling rollers 354 are moved and pressure-contacted with the outer peripheral portion of the adaptor 352 by being pushed by the guide faces 360 of the lock pieces 356. However, when the coupling rollers 354 are pressure-contacted against the outer peripheral portion of the adaptor 352 by rapid rotation of the base plate 92, a large load acts on the lock pieces 356.

Now, in the present embodiment, because the lock pieces 356 are basically structured as separate bodies from the base plate 92, the mechanical strength of the lock pieces 356 alone can be improved. Therefore, even though the weight may be increased by the lock pieces 356 being formed of a material with sufficient strength to withstand the above-mentioned load, this increase in weight will be limited to the lock pieces 356 alone.

Moreover, because the mechanical strength of the lock pieces 356 is improved and the mechanical strength of the base plate 92 as a whole is not increased more than necessary, a material which is comparatively light in weight can be used for the base plate 92 as a whole, apart from the lock pieces 356. Therefore, a reduction in weight of the clutch 350 as a whole can be expected.

Further still, in this structure, as described above, the coupling rollers 354 move by being pushed by the guide faces 360. Therefore, a duration, from when the base plate 92 starts to rotate until the coupling rollers 354 are pressure-contacted against the outer peripheral face of the adaptor 352, or the like is finely varied by an angle of inclination, radius of curvature or the like of the guide faces 360.

As described above, the lock pieces 356 in the present embodiment are individually structured as separate bodies from the base plate 92. Therefore, the lock pieces 356 can be suitably selected from a plurality of types thereof, with different angles of inclination, radiuses of curvature and the like, in accordance with specifications, requirements and the like of the vehicle. Thus, a specified duration for the coupling rollers 354 to pressure-contact against the outer peripheral face of the adaptor 352 or the like can be easily changed without changing components other than the lock pieces 356, such as the base plate 92.

In the present embodiment, as described above, rotation of the rotation disc 362 to follow the base plate 92 is forcibly limited by the braking mechanism 300, and moreover, the rotation disc 362 is forcibly rotated in the drawing direction. Thus, the base plate 92 can be quickly and assuredly caused to relatively rotate in the winding direction with respect to the rotation disc 362. Hence, mechanical coupling of the base plate 92 with the adaptor 352 can be quickly and assuredly implemented by the above-described movement of the coupling rollers 354.

When the rotating force of the motor 44 rotates the spool 20 in the winding direction as described above, the restraining force on the occupant's body from the webbing belt 28 is increased. However, in the state in which the spool 20 has wound up the webbing belt 28 until the slack is eliminated, the body of the occupant becomes a hindrance to the webbing belt 28 and, in basic terms, the spool 20 cannot wind the webbing belt 28 up further.

From this state, if the spool 20 starts to rotate further in the winding direction for winding up the webbing belt 28, the webbing belt 28 will constrict the body of the occupant with a greater force than required, which is not preferable.

Here, when the spool 20 starts to wind up the webbing belt 28 more than is required as described above, the body of the occupant becomes a hindrance to winding of the webbing belt 28, and a tension force is applied to the webbing belt 28 from the body of the occupant with a magnitude that corresponds to the winding force of the spool 20 winding up the webbing belt 28. This tension force acts in a direction opposite to the direction in which the spool 20 winds the webbing belt 28. Therefore, when this tension force is applied to the webbing belt 28, the spool 20 stops.

In this state, the rotation force of the motor 44 is being applied to the spool 20 via the external gear 102, the base plate 92, the coupling rollers 354 and the adaptor 352. Thus, in the state in which the spool 20 has stopped, the coupling rollers 354, which have been pressed in between the adaptor 352 and the guide faces 360, limit rotation of the base plate 92 in the winding direction, via the lock pieces 356. Further, the base plate 92, via the torque limiters 104, limits rotation of the external gear 102 in the winding direction.

In the state in which the rotation of the external gear 102 is thus limited by the base plate 92 via the torque limiters 104, if the external gear 102 starts to rotate further in the winding direction, the rotation force at this time overcomes the spring force of the torque limiters 104, and the engaging portions 106 of the torque limiters 104 are disengaged from the engaging recess portions 100. As a result, the coupling of the base plate 92 with the external gear 102 is temporarily released, and the external gear 102 alone rotates in the winding direction until the engaging portions 106 enter into others of the engaging recess portions 100, which are adjacent to the engaging recess portions 100 mentioned above.

Thus, when the coupling of the base plate 92 and the external gear 102 is released, transmission of the rotation force of the external gear 102 to the base plate 92, which is to say transmission of the rotation force of the motor 44 to the spool 20, is blocked. Therefore, an increase in the restraining force from the webbing belt 28 can be suppressed.

As described hereabove, the clutch 350 differs from the clutch 90 of the first embodiment in being a structure which transmits the rotation of the external gear 102 to the adaptor 352 by the coupling rollers 354, but the torque limiters 104 are the same as in the first embodiment. Further, in the clutch 90, the rotation disc 140 and the pawls 130 are disposed between the peripheral wall 96 and the adaptor 112, whereas in the clutch 350, the lock pieces 356, the coupling rollers 354 and the rotation disc 362 are disposed between the peripheral wall 96 and the adaptor 352. Consequently, an overall thickness dimension of the clutch 350 can be set to approximately the axial direction dimension of the external gear 102. Thus, the clutch 350 can be made thinner, and the webbing winding device 210 can be made smaller.

The present embodiment has a structure in which the forward surveillance sensor 54 drives the motor 44 via the driver 46 on the basis of a signal from the forward surveillance sensor 54 when the distance forward to the obstacle falls below a certain value. However, a structure is also possible in which, for example, the motor 44 is driven when a rapid deceleration state of the vehicle is detected by an acceleration sensor.

As has been described above, in a webbing winding device relating to the present invention, even though a torque limiter is provided at a clutch mechanism which is for transmitting driving force of driving means, an overall axial direction dimension can be kept to a dimension of a motor side rotating body peripheral wall along a direction intersecting the axis. Furthermore, because the structures described above are superposed along the axial direction of the peripheral wall, a dimension of the clutch mechanism of this webbing winding device along the axial direction of the peripheral wall can be made smaller. Accordingly, reductions in size and thickness of the device as a whole are possible.

Further yet, in a clutch mechanism relating to the present invention, a dimension along a direction intersecting the axis (a radial direction) can be kept to a dimension of an outer side rotating body along this direction. Moreover, because the structures of the clutch mechanism are disposed as described above, the structures are superposed along the axial direction of an outer side peripheral wall. Consequently, a dimension of the clutch mechanism along the axial direction of the outer side peripheral wall can be made smaller. Accordingly, reductions in size and thickness are possible for, for example, various devices to which this clutch mechanism is applied.

What is claimed is:

1. A webbing winding device comprising:
   a winding shaft at which a proximal end portion of a long belt-form webbing belt is anchored, the winding shaft winding the webbing belt in a layered form at a periphery thereof when the winding shaft is rotated in a winding direction one way about an axis thereof, and the winding shaft rotating in a drawing out direction, which is opposite to the winding direction, while the webbing belt is drawn out by the webbing belt being pulled to a distal end side thereof;
   a slave shaft coaxially and integrally attached to the winding shaft;
   a motor side rotating body including a peripheral wall, at an inner side of which the slave shaft is disposed at a vicinity of an axial center of the motor side rotating body, the motor side rotating body being coaxially relatively rotatable with respect to the slave shaft, and the motor side rotating body receiving driving force from driving means for rotating about the axial center of the slave shaft;
   a ring-form intermediate rotating body disposed at the inner side of the peripheral wall, between the slave shaft and the peripheral wall, the intermediate rotating body being relatively rotatable about the axial center of the motor side rotating body with respect to both the motor side rotating body and the slave shaft;
   a coupling member disposed between the intermediate rotating body and an outer peripheral portion of the slave shaft, the coupling member mechanically coupling the intermediate rotating body with the slave shaft in conjunction with rotation of the motor side rotating body; and
   a torque limiter disposed between an inner peripheral portion of the peripheral wall and an outer peripheral portion of the intermediate rotating body, the torque limiter including one portion which is anchored at one of the peripheral wall and the intermediate rotating body and another portion which is engaged with the other of the peripheral wall and the intermediate rotating body, the torque limiter mechanically coupling the peripheral wall with the intermediate rotating body and the engagement being released by a relative rotation force of the peripheral wall with respect to the intermediate rotating body of at least a predetermined value.

2. The webbing winding device of claim 1, wherein
   the torque limiter includes a resilient member,
   the resilient member is formed so as to be one of a substantial plate form with a thickness direction thereof along a direction intersecting the axis of the motor side rotating body and a thin-walled tubular form including an internal diametric dimension thereof greater than an external diametric dimension of the intermediate rotating body and an external diametric dimension thereof smaller than an internal diametric dimension of the peripheral wall,
   the resilient member is disposed between the inner peripheral portion of the peripheral wall and the outer peripheral portion of the intermediate rotating body with the one portion being anchored at the one of the inner peripheral portion of the peripheral wall and the outer peripheral portion of the intermediate rotating body, and the other portion resiliently engaging to the side of the other of the inner peripheral portion of the peripheral wall and the outer peripheral portion of the intermediate rotating body by urging force of the other portion,
   and the resilient engagement is released at a time at which the relative rotation force counteracts the urging force.

3. The webbing winding device of claim 2, wherein the resilient member includes the substantial plate form, a portion of a peripheral wall at the outer peripheral portion of the intermediate rotating body is recessed to a radial direction inner side to form an engaging recess portion, a portion of the torque limiter protrudes to the radial direction inner side to form an engaging portion, the engaging portion resiliently engages at the engaging recess portion, and this resilient engagement is released at the time at which the relative rotation force counteracts the urging force.

4. The webbing winding device of claim 2, wherein the resilient member includes the substantial plate form, an engaging recess portion is formed at a portion of an inner periphery of the motor side rotating body, a portion of the torque limiter protrudes to a radial direction outer side to form an engaging portion, and the engaging portion is engageable at the engaging recess portion for substantially integrally coupling the motor side rotating body with the torque limiter.

5. The webbing winding device of claim 2, wherein the resilient member includes the thin-walled tubular form, gear-like engaging recess portions are formed at a peripheral wall at the outer peripheral portion of the intermediate rotating body, a portion of the torque limiter protrudes to a radial direction inner side to form an engaging portion, the engaging portion resiliently engages at the engaging recess portions, and this resilient engagement is released at the time at which the relative rotation force counteracts the urging force.

6. The webbing winding device of claim 2, wherein the resilient member includes the thin-walled tubular form, an engaging protrusion is formed at a portion of an inner periphery of the motor side rotating body, an engaging hole is formed in the torque limiter, and the engaging protrusion is engageable at the engaging hole for substantially inte grally coupling the motor side rotating body with the torque limiter.

7. The webbing winding device of claim 1, further comprising:

a coupling compelling member disposed at the inner side of the peripheral wall to be coaxially relatively rotatable with respect to both the motor side rotating body and the slave shaft, relative rotation of the coupling compelling member with respect to the motor side rotating body causing the coupling compelling member to move and mechanically couple the intermediate rotating body with the slave shaft; and an urging member disposed at the inner side of the peripheral wall to be capable of rotating to follow rotation of the motor side rotating body, the urging member urging the coupling compelling means in the direction of rotation of the motor side rotating body.

* * * * *